US010838268B2

(12) United States Patent
Yeh et al.

(10) Patent No.: US 10,838,268 B2
(45) Date of Patent: Nov. 17, 2020

(54) PIXEL STRUCTURE

(71) Applicant: AU Optronics Corporation, Hsin-Chu (TW)

(72) Inventors: Yu-Ling Yeh, Hsin-Chu (TW); Che-Min Lin, Hsin-Chu (TW); Chu-Kuan Yu, Hsin-Chu (TW); Chun-Ru Huang, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 0 days.

(21) Appl. No.: 16/711,778

(22) Filed: Dec. 12, 2019

(65) Prior Publication Data

US 2020/0218122 A1   Jul. 9, 2020

(30) Foreign Application Priority Data

Jan. 7, 2019   (TW) .............................. 108100581 A
Aug. 22, 2019   (TW) .............................. 108130102 A

(51) Int. Cl.
*G02F 1/1343* (2006.01)
*G02F 1/1362* (2006.01)
*G02F 1/1337* (2006.01)

(52) U.S. Cl.
CPC ...... *G02F 1/134309* (2013.01); *G02F 1/1343* (2013.01); *G02F 1/133707* (2013.01); *G02F 1/134363* (2013.01); *G02F 1/136286* (2013.01); *G02F 2001/133749* (2013.01); *G02F 2001/134372* (2013.01); *G02F 2201/123* (2013.01); *G02F 2201/124* (2013.01)

(58) Field of Classification Search
CPC ......... G02F 1/134309; G02F 1/136286; G02F 2001/133749; G02F 2201/123
See application file for complete search history.

(56) References Cited

U.S. PATENT DOCUMENTS

| | | | |
|---|---|---|---|
| 7,727,789 B2 | 6/2010 | Chen et al. | |
| 9,298,051 B2 | 3/2016 | Matsushima | |
| 10,026,374 B2 * | 7/2018 | Ito | G02F 1/136286 |
| 2005/0128410 A1 | 6/2005 | Lee | |
| 2005/0133791 A1 | 6/2005 | Yang | |

(Continued)

FOREIGN PATENT DOCUMENTS

| | | |
|---|---|---|
| TW | I526754 B | 3/2016 |
| TW | I648581 B | 1/2019 |

*Primary Examiner* — Hoan C Nguyen
(74) *Attorney, Agent, or Firm* — WPAT, PC

(57) ABSTRACT

A pixel structure includes a first, second and third electrode layers and a switch element. The second electrode layer is disposed above the first electrode layer and includes a first and second main body portions and a first and second branch portions. The first main body portion and the first branch portion extend in a first direction. The first branch portion protrudes from the first to second main body portion. The second branch portion protrudes from the second to first main body portion. The third electrode layer is disposed above the second electrode layer and includes a third and fourth main body portion and a third branch portion. The third and fourth main body portions extend in the first direction. The third branch portion connects the third to fourth main body portion. The switch element is electrically connected to the first or third electrode layer.

24 Claims, 39 Drawing Sheets

(56) References Cited

U.S. PATENT DOCUMENTS

| | | |
|---|---|---|
| 2005/0280763 A1 | 12/2005 | Kang et al. |
| 2008/0198318 A1 | 8/2008 | Lee |
| 2008/0258196 A1 | 10/2008 | Chen |
| 2009/0310047 A1* | 12/2009 | Shin .................... G09G 3/3659 349/37 |
| 2010/0053484 A1* | 3/2010 | Ono ................. G02F 1/134363 349/37 |
| 2013/0107151 A1* | 5/2013 | Sasaki .................. G02F 1/1368 349/38 |
| 2014/0002762 A1* | 1/2014 | Iwata .................. G09G 3/3648 349/42 |
| 2014/0092353 A1 | 4/2014 | Matsushima |
| 2014/0354931 A1 | 12/2014 | Kurasawa et al. |
| 2017/0039975 A1 | 2/2017 | Ito et al. |
| 2019/0212615 A1* | 7/2019 | Tomotoshi ........ G02F 1/133711 |
| 2019/0227398 A1* | 7/2019 | Cheng .............. G02F 1/134309 |
| 2019/0271891 A1 | 9/2019 | Lin et al. |

\* cited by examiner

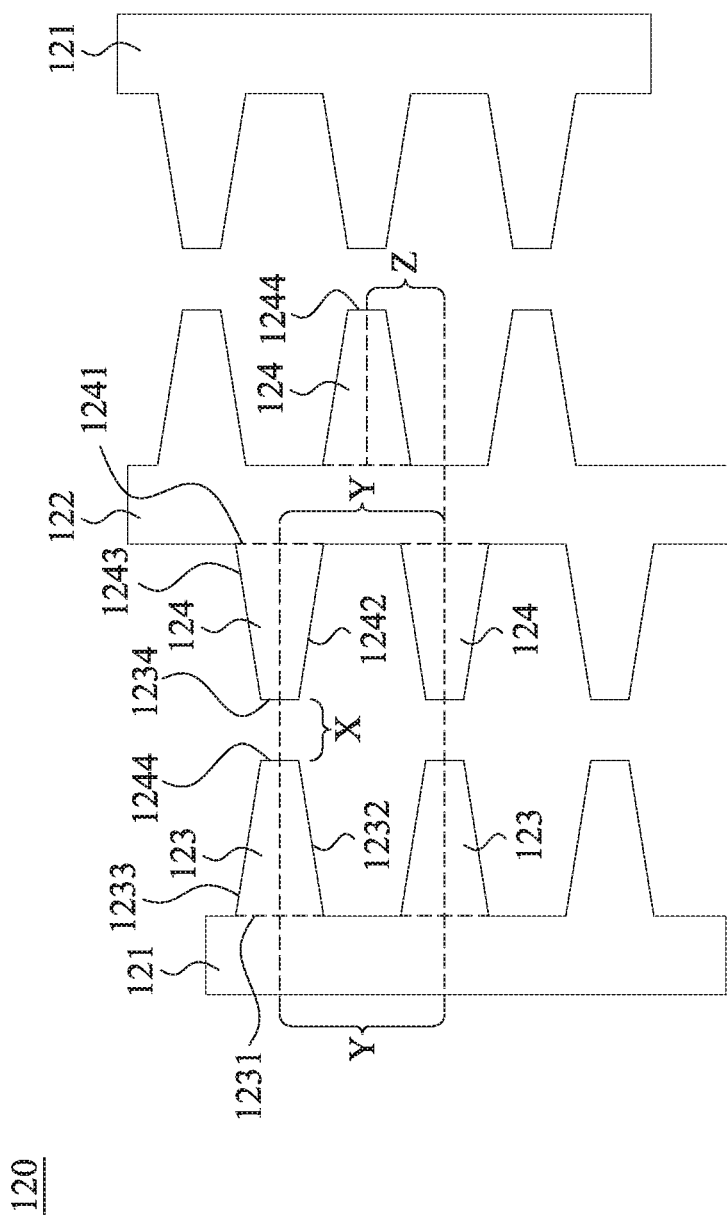
Fig. 1B
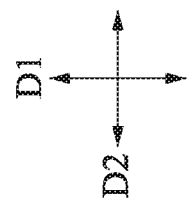

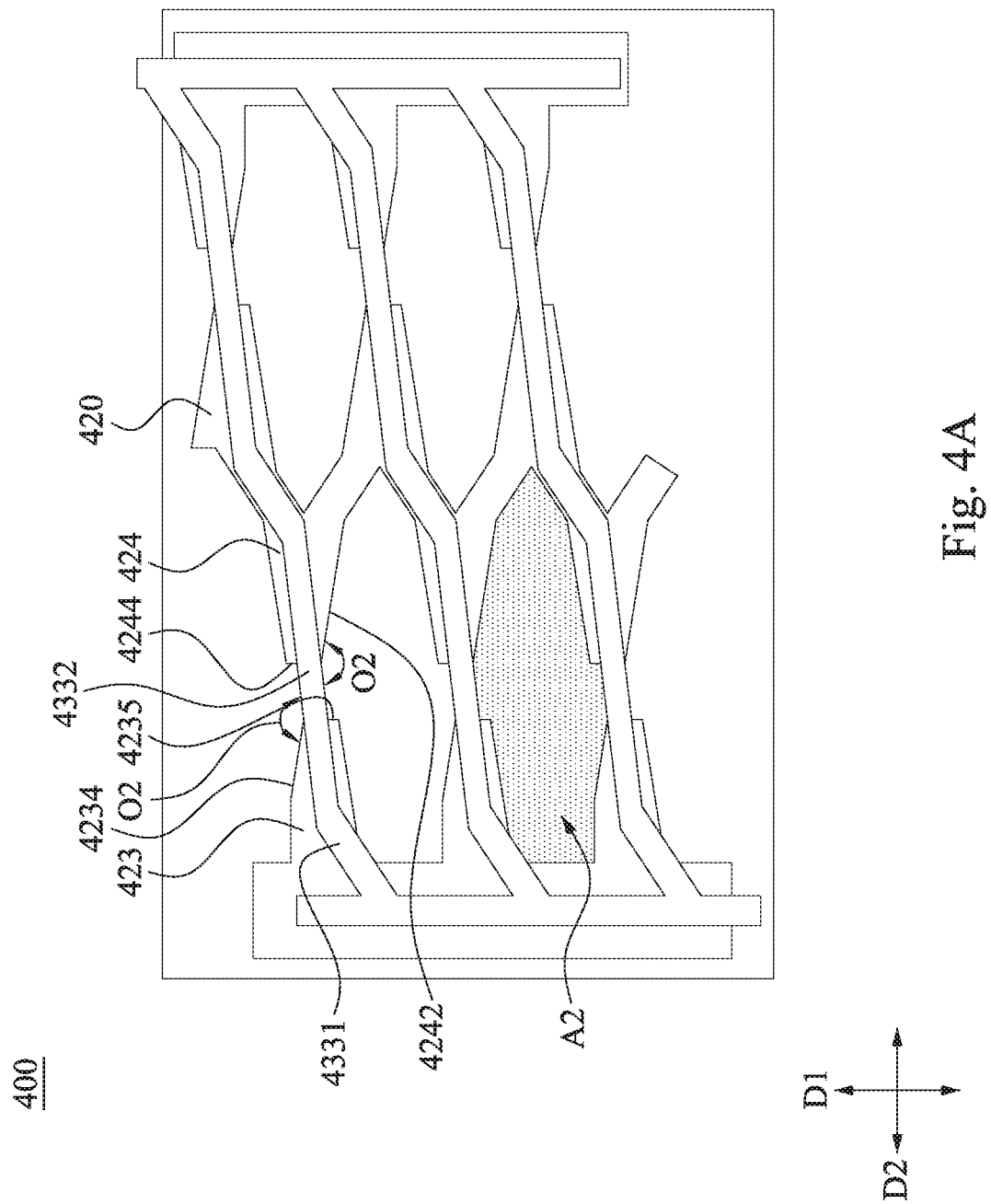

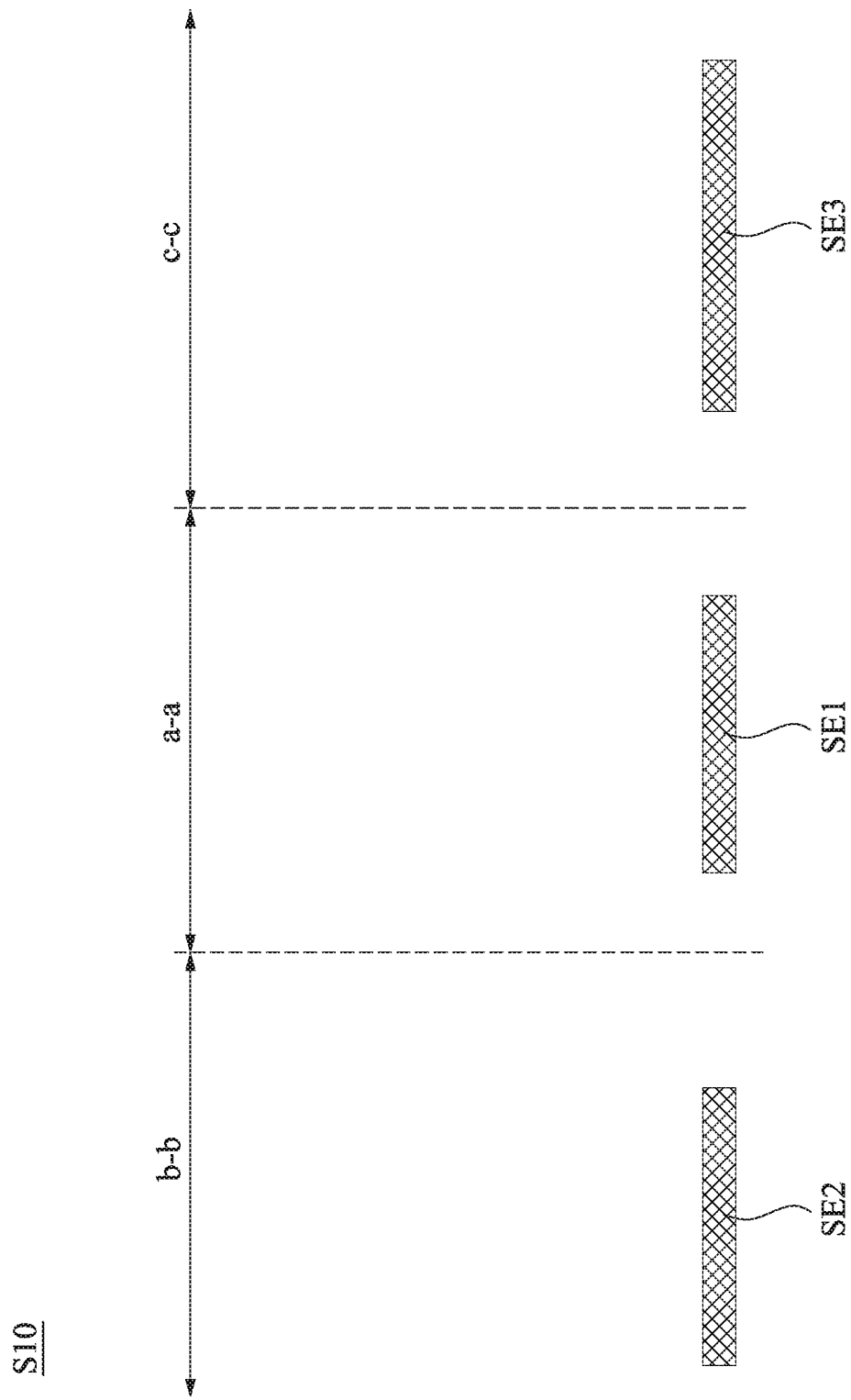

PIXEL STRUCTURE

RELATED APPLICATIONS

This application claims priority to Taiwan Application Serial Number 108130102, filed Aug. 22, 2019, and Taiwan Application Serial Number 108100581, filed Jan. 7, 2019, all of which are herein incorporated by reference in their entireties.

BACKGROUND

Field of Invention

The present disclosure relates to a pixel structure.

Description of Related Art

In display devices, the light transmission efficiency of a pixel structure affects the bright to dark contrast ratio, the color saturation, etc. of a picture displayed. Therefore, the current displays improve the light transmission efficiency mostly by increasing the aperture ratio of a pixel and increasing the voltage gap. However, in some specific applications, it is necessary to further reduce the response time for liquid crystals to avoid image blurring in the picture. For example, for gaming applications, the user must track the moving objects in the picture, and excessively long response time for liquid crystals may cause the phenomenon of edge blurring.

In summary, the above issue is an important problem to be solved in the field of display devices.

SUMMARY

An aspect of the present disclosure is to provide a pixel structure including a first electrode layer, a second electrode layer, a third electrode layer, and a switch element. The second electrode layer is disposed above the first electrode layer and includes a first main body portion, a second main body portion, a first branch portion, and a second branch portion. The first main body portion and the first branch portion extend in a first direction. The first branch portion protrudes from the first main body portion to the second main body portion. The second branch portion protrudes from the second main body portion to the first main body portion. The third electrode layer is disposed above the second electrode layer and includes a third main body portion, a fourth main body portion, and a third branch portion. The third main body portion and the fourth main body portion extend in the first direction. The third branch portion connects the third main body portion to the fourth main body portion. The switch element is electrically connected to the first electrode layer or the third electrode layer.

In an embodiment of the present disclosure, the second main body portion of the second electrode layer includes a plurality of first inclined segments and a plurality of second inclined segments. The first inclined segments and the second inclined segments interconnect alternatively to form a zigzag shape.

In an embodiment of the present disclosure, a first acute angle $\Phi 1$ is between the first inclined segments and the first direction, and a second acute angle $\Phi 2$ is between the second inclined segments and the second direction, and the first acute angle $\Phi 1$ is equal to the second acute angle $\Phi 2$.

In an embodiment of the present disclosure, the second branch portion is located at a junction between one of the first inclined segments and one of the second inclined segments.

In an embodiment of the present disclosure, the first branch portion is a pentagon, and the second branch portion is a trapezoid.

In an embodiment of the present disclosure, an area of the first branch portion is smaller than an area of the second branch portion.

In an embodiment of the present disclosure, a side of the first branch portion is perpendicular to the first direction, and the other four sides are at least partially symmetrical about four sides of the second branch portion.

In an embodiment of the present disclosure, the first branch portion is aligned with the second branch portion.

In an embodiment of the present disclosure, the first branch portion is staggered with the second branch portion.

In an embodiment of the present disclosure, the third branch portion of the third electrode layer includes a first connecting segment, a second connecting segment, and a third connecting segment. The first connecting segment connects to the third main body portion or the fourth main body portion, and a first acute angle $\theta 1$ is between the first connecting segment and a second direction perpendicular to the first direction. The second connecting segment connects to the first connecting segment, and a second acute angle $\theta 2$ is between the second connecting segment and the second direction. The third connecting segment connects to the second connecting segment, and a third acute angle $\theta 3$ is between the third connecting segment and the second direction, in which the second acute angle $\theta 2$ is larger than the first acute angle $\theta 1$ and the third acute angle $\theta 3$.

In an embodiment of the present disclosure, the first connecting segment partially overlaps the first branch portion, and the second connecting segment partially overlaps the first branch portion and the second branch portion, and the third connecting segment overlaps the second main body portion and the second branch portion.

In an embodiment of the present disclosure, the first main body portion partially overlaps the third main body portion.

In an embodiment of the present disclosure, the pixel structure further comprises a data line or a gate line extending in the first direction, in which the first main body portion and the third main body portion overlap the data line or the gate line, and the first electrode layer does not overlap the data line or the gate line.

In an embodiment of the present disclosure, the pixel structure further comprises a data line or a gate line extending in the first direction, in which the first main body portion and the third main body portion do not overlap the data line or the gate line, and the first electrode layer overlaps the data line or the gate line.

In an embodiment of the present disclosure, the pixel structure further comprises a data line or a gate line extending in the first direction, in which the first electrode layer, the first main body portion, and the third main body portion partially overlap the data line or the gate line.

In an embodiment of the present disclosure, the pixel structure further comprises a voltage control structure electrically connected to the second electrode layer and being able to control an electric potential of the second electrode layer to be equal to an electric potential of the first electrode layer or the third electrode layer in a switchable manner.

In an embodiment of the present disclosure, a number of the third branch portions is plural, and two of the third branch portions adjacent to each other form a first opening with the third main body portion and the fourth main body portion.

In an embodiment of the present disclosure, the second electrode layer separates the first opening into two second openings.

In an embodiment of the present disclosure, numbers of the first main body portion, the first branch portion, the second branch portion, and the third branch portion are plural, and the second electrode layer is symmetrical to the third electrode layer about the second main body portion.

In an embodiment of the present disclosure, numbers of the first main body portion, the first branch portion, the second branch portion, and the third branch portion are plural, and the second electrode layer is symmetrical to the third electrode layer about a second direction perpendicular to the first direction.

In an embodiment of the present disclosure, the pixel structure further includes a bridging electrode electrically connected to the first electrode layer.

In an embodiment of the present disclosure, the pixel structure further includes a data line and a scan line. The data line extends in the first direction and is electrically connected to the second electrode and the third electrode. The scan line extends in the second direction and is electrically connected to the first electrode through the bridging electrode.

In an embodiment of the present disclosure, the pixel structure further includes a bridging electrode electrically connected to the third electrode layer.

In an embodiment of the present disclosure, the pixel structure further includes a data line and a scan line. The data line extends in the first direction and is electrically connected to the first electrode and the second electrode. The scan line extends in the second direction and is electrically connected to the third electrode through the bridging electrode.

In the aforementioned embodiments of the present disclosure, the pixel structure in the present disclosure is switched between a first mode and a second mode by the second electrode layer disposed between the first electrode layer and the third electrode layer, under which the first mode has the advantage of high light transmission efficiency while the second mode has the advantage of high response speed for liquid crystals. In this way, the pixel structure can be applied in different scenarios. On the other hand, by changing the appearances, profiles, and various parameters of the second electrode layer and the third electrode layer, the light transmission efficiency, voltage stability, and angle of view of the pixel structure under the first mode and the second mode are further improved.

BRIEF DESCRIPTION OF THE DRAWINGS

The disclosure can be more fully understood by reading the following detailed description of the embodiments, with reference made to the accompanying drawings as follows:

FIG. 1B is a top view of the second electrode layer shown in FIG. 1A;

FIG. 4A is a top view of a pixel structure according to another embodiment of the present disclosure;

FIG. 11A to FIG. 18B are schematic diagrams of processes at various stages of a manufacturing method of a pixel structure according to an embodiment of the present disclosure;

DETAILED DESCRIPTION

Figure 1A:
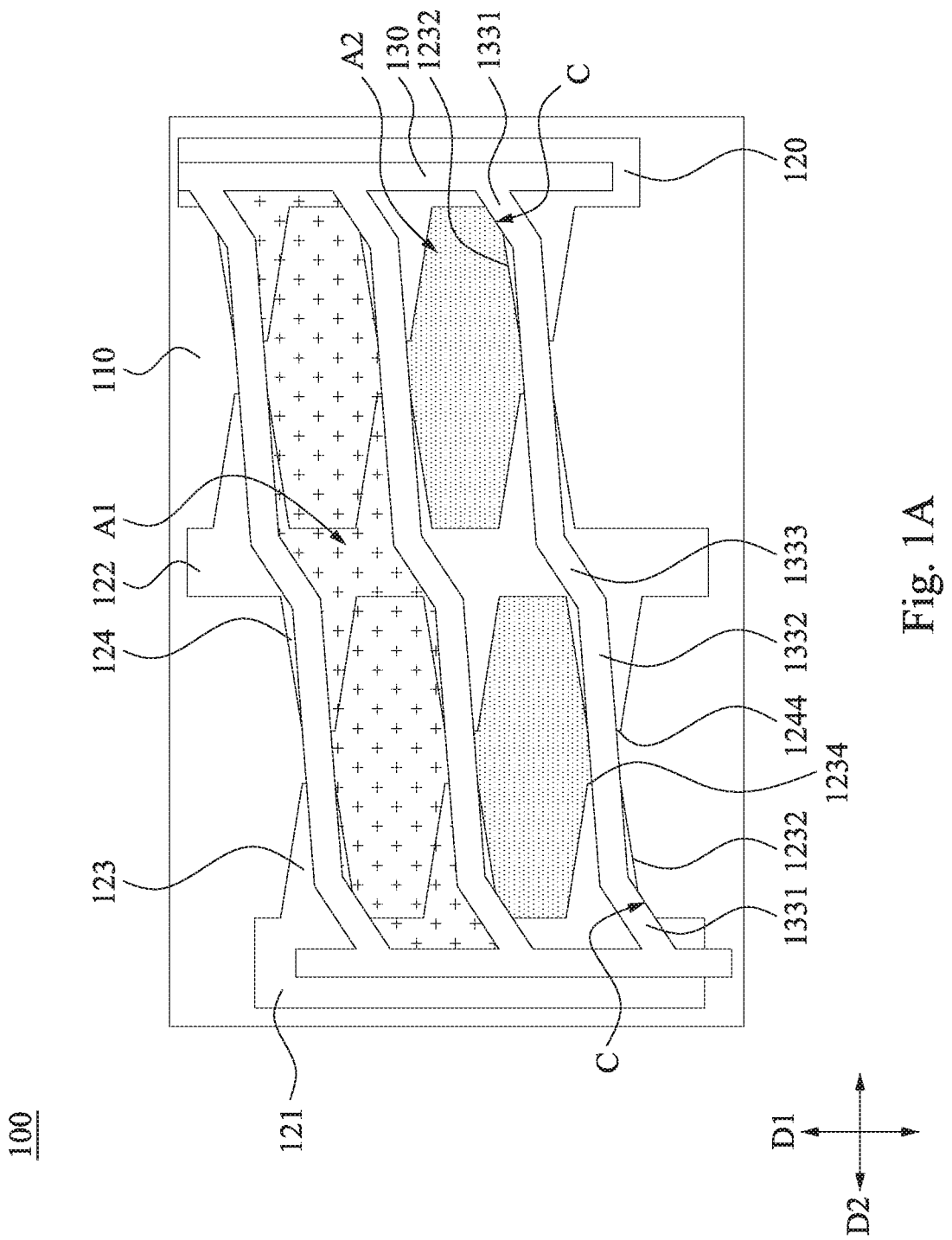
FIG. 1A is a top view of a pixel structure according to an embodiment of the present disclosure.

Reference will now be made in detail to the present embodiments of the disclosure, examples of which are illustrated in the accompanying drawings. Wherever possible, the same reference numbers are used in the drawings and the description to refer to the same or like parts.

FIG. 1A is a top view of a pixel structure 100 according to an embodiment of the present disclosure. The pixel structure 100 may be applied to various displays. For example, the display may include an array of pixel structures 100 and displays images of different brightness and color on the display by controlling the light transmittance of each of the pixel structure 100 in the array.

In the present embodiment, each of the pixel structure 100 further includes liquid crystal molecules (not shown in the drawings), and the pixel structure 100 adopts a fringe field switching (FFS) principle to change the inclined angle of the liquid crystal molecules to further change the light transmittance of the pixel structure 100 itself. In the present embodiment, the liquid crystal molecules can be rubbed in a first direction D1.

Specifically, as shown in FIG. 1A, the pixel structure 100 includes a first electrode layer 110, a second electrode layer 120, and a third electrode layer 130. The second electrode layer 120 is disposed above the first electrode layer 110. The third electrode layer 130 is disposed above the second electrode layer 120. In the present embodiment, the first electrode layer 110 is a full-pattern electrode, the third electrode layer 130 surrounds to form a plurality of openings A1, and the second electrode layer 120 and the third electrode layer 130 together surround to form a plurality of openings A2. Specifically, the opening A1 refers to a region which the third electrode layer 130 is projected outside the first electrode layer 110, and the opening A2 refers to a region which the second electrode layer 120 and the third electrode layer 130 are together projected outside the first electrode layer 110.

In the present embodiment, the first electrode layer 110 and the third electrode layer 130 may serve as a common electrode and a pixel electrode of the pixel structure 100, respectively. For example, in some embodiments, the first electrode layer 110 is the common electrode having a stable common voltage $V_{com}$, and the third electrode layer 130 is the pixel electrode having a controllable pixel voltage $V_{pixel}$, but the present disclosure is not limited in this regard. In other embodiments, the first electrode layer 110 may be the pixel electrode having the controllable pixel voltage $V_{pixel}$, and the third electrode layer 130 may be the common electrode having the stable common voltage $V_{com}$.

Specifically, the pixel electrode can change the pixel voltage $V_{pixel}$ according to signals of the data line, such that a voltage flux is generated between the pixel electrode and the common electrode due to the voltage difference, and the liquid crystal molecules located in these regions are inclined by the influence of the voltage flux. The light transmittance of the pixel structure 100 can be controlled according to the inclined direction and the inclined degree of the liquid crystal molecules.

As shown in FIG. 1A, the second electrode layer 120 is disposed between the first electrode layer 110 and the third electrode layer 130, and the second electrode layer 120 is a switchable electrode of which the voltage can be switched between the common voltage $V_{com}$ and the pixel voltage $V_{pixel}$. In other words, the voltage of the second electrode layer 120 may be equal to the voltage of the first electrode layer 110 or the third electrode layer 130. Specifically, the second electrode layer 120 can be electrically connected to an external electric potential control structure (not shown in the drawings), and the electric potential control structure can control the voltage of the second electrode layer 120 to be switched from the common voltage $V_{com}$ to the pixel voltage $V_{pixel}$, or from the pixel voltage $V_{pixel}$ to the common voltage $V_{com}$.

In the present embodiment, when the voltage of the second electrode layer 120 is equal to the voltage of the first electrode layer 110, the pixel structure 100 is under a first mode; when the voltage of the second electrode layer 120 is equal to the third electrode layer 130 At voltage, the pixel structure 100 is under a second mode. The pixel structure 100 has different performances and characteristics when being under the first mode and the second mode to suit different scenarios, and the details of which will be described below.

When the pixel structure 100 is under the first mode, a current control structure controls the voltage of the second electrode layer 120 to be equal to the voltage of the first electrode layer 110. At this time, the second electrode layer 120 and the first electrode layer 110 are equipotential, and no connected voltage flux is generated between the second electrode layer 120 and the first electrode layer 110. When the third electrode layer 130 and the other two electrode layers generate a voltage difference, the voltage flux is connected between the third electrode layer 130 and the first electrode layer 110 and between the third electrode layer 130 and the second electrode layer 120. Specifically, as shown in FIG. 1A, the voltage flux extends from the third electrode layer 130 into the opening A1, such that the liquid crystal molecules located in the opening A1 are inclined by the influence of the voltage flux.

When the pixel structure 100 is under the second mode, the current control structure controls the voltage of the second electrode layer 120 to be equal to the voltage of the third electrode layer 130. At this time, the second electrode layer 120 and the third electrode layer 130 are equipotential, and no connected voltage flux is generated between the second electrode layer 120 and the third electrode layer 130. In this case, when the first electrode layer 110 and other two electrode layers generate a voltage difference, the voltage flux is connected between the first electrode layer 110 and the second electrode layer 120 and between the first electrode layer 110 and the third the electrode layer 130. Specifically, as shown in FIG. 1A, the voltage flux extends from the second electrode layer 120 and the third electrode layer 130 into the opening A2, such that the liquid crystal molecules located in the opening A2 are inclined by the influence of the voltage flux.

It can be understood from the above that when the pixel structure 100 is under the first mode and the second mode, the ratio of the area occupied by the affected liquid crystal molecules in the pixel structure 100 are different. For example, as shown in FIG. 1A, the liquid crystal molecules in the opening A1 are affected under the first mode, while the liquid crystal molecules in the opening A2 are affected under the second mode.

As shown in FIG. 1A, the area occupied by the opening A1 is larger than the area occupied by the opening A2 in a pixel structure 100. In the case which the liquid crystal molecules are positive liquid crystal molecules, the light transmission efficiency of the first mode is higher than that of the second mode. Conversely, when the area occupied by the opening A2 is smaller than the area occupied by the opening A1, the density of the voltage flux in the opening A2 is higher, such that the response speed for the liquid crystals under the second mode is higher than the response speed for the liquid crystals under the first mode.

As described above, when the pixel structure 100 is under the first mode, it has a higher light transmission efficiency and can show a better light to dark contrast ratio, and thus is particularly suitable for applications to playing videos, photos, texts, and the like. When the pixel structure 100 is under the second mode, it has a higher response speed for the liquid crystals, and the higher response speed is beneficial to reduce the problem of edge blurring as the human eye tracks the moving image, that is, to reduce the moving picture response time (MPRT) of the display, thereby being particularly suitable for applications to video entertainment. That is to say, users can switch the pixel structure 100 between the first mode and the second mode according to the scenario, thereby enabling the pixel structure 100 to be applicable to a plurality of different application scenarios.

Reference is made to Table 1 below. Table 1 is a numerical table which lists the light transmission efficiency (T %), on delay ($T_{on}$), off delay ($T_{off}$), and total delay ($T_{total}$) of the pixel structure 100 under the first mode and the second mode shown in FIG. 1A.

TABLE 1

|  | first mode | second mode |
| --- | --- | --- |
| T % | 100% | 56% |
| $T_{on}$ | 5.88 ms | 2.07 ms |
| $T_{off}$ | 5.58 ms | 3.43 ms |
| $T_{total}$ | 11.46 ms | 5.50 ms |

As shown in Table 1, the pixel structure 100 has higher light transmission efficiency under the first mode, but the delay time of the switch of the liquid crystals is longer; the pixel structure 100 has lower light transmission efficiency in the second mode, but the delay time of the switch of the liquid crystals is shorter.

The operation principle of the pixel structure 100 has been generally described above, and the details and design principles of the first electrode layer 110, the second electrode layer 120, and the third electrode layer 130 in the pixel structure 100 will be described as follows. It should be understood that the following descriptions only serve as examples, and a person of ordinary skill in the art can make various changes in the circumstances without departing from the spirit and scope of the present disclosure.

FIG. 1B is a top view of the second electrode layer 120 shown in FIG. 1A. As shown in FIG. 1B, the second electrode layer 120 includes a first main body portion 121, a second main body portion 122, a first branch portion 123, and a second branch portion 124. The first main body portion 121 extends in the first direction D1. The second main body portion 122 is parallel to the first main body portion 121 and also extends in the first direction D1. The first branch portion 123 protrudes from the first main body portion 121 to the second main body portion 122. The second branch portion 124 protrudes from the second main body portion 122 to the first main body portion 121.

As shown in FIG. 1B, the first branch portion 123 is a trapezoid and includes four sides: a bottom side 1231, a first side 1232, a second side 1233, and a top side 1234. The bottom side 1231 joints the first main body portion 121. The top side 1234 is parallel to the bottom side 1231. The first side 1232 and the second side 1233 are connected between the bottom side 1231 and the top side 1234.

As shown in FIG. 1B, the second branch portion 124 is also a trapezoid and includes four sides: a bottom side 1241, a first side 1242, a second side 1243, and a top side 1244. The bottom side 1241 joints the second main body portion 122. The top side 1244 is parallel to the bottom side 1241. The first side 1242 and the second side 1243 are connected between the bottom side 1241 and the top side 1244.

In the embodiment shown in FIG. 1B, the first branch portion 123 is symmetrical to the second branch portion 124, and the center of the top side 1234 of the first branch portion 123 is aligned with the center of the top side 1244 of the second branch portion 124. The first branch portion 123 is apart from the second branch portion 124 by a distance X in a second direction D2 (which is perpendicular to the first direction D1). In some embodiments, the distance X is in a range of about 2 microns to 5 microns.

As shown in FIG. 1B, the pixel structure 100 may include a plurality of first branch portions 123 and a plurality of second branch portions 124. The first branch portions 123 are sequentially connected to the first main body portion 121 in the first direction D1, and the second branch portions 124 are sequentially connected to the second main body portion 122 in the first direction D1. The adjacent two first branch portions 123 are separated by each other by a distance Y, and the adjacent two second branch portions 124 are also separated by each other by a distance Y. For example, the distance Y may refer to the distance between the centers of the top side 1234 of the adjacent two first branch portions 123 in the first direction D1. In some embodiments, the distance Y may also refer to the distance between the centers of gravity of the adjacent two first branch portions 123. In some embodiments, the distance Y is in a range of about 4 microns to 10 microns.

As shown in FIG. 1A and FIG. 1B, a plurality of first main body portions 121 may be included in one pixel structure 100. In the present embodiment, the second main body portion 122 is disposed between the two first main body portions 121, and the second branch portions 124 protrudes from the two sides of the second main body portion 122 to the two first main body portions 121. In the present embodiment, the second branch portions 124 on both sides of the second main body portion 122 are staggered from each other. That is, the center of the top side 1244 of the second branch portion 124 on a side of the second main body portion 122 is apart from the center of the top side 1244 of the second branch portion 124 on the opposite side of the second main body portion 122 by a distance Z in the first direction D1. In some embodiments, the distance Z can be less than or equal to the distance Y.

It should be understood that the second electrode layer 120 may also include a plurality of second main body portions 122. For example, the structures shown in FIG. 1B may be repeatedly arranged in the second direction D2. Specifically, the second electrode layer 120 may be extended in the first direction D1 or the second direction D2 according to the size of each pixel of the pixel structure 100. At the same time, the parameters mentioned above (such as the distance X, Y, Z) and the size of the trapezoid may be adjusted to further optimize the performance of the pixel structure 100. The above embodiments are only for illustrative purposes and should not be limited to the description of the present disclosure.

Figure 1C:
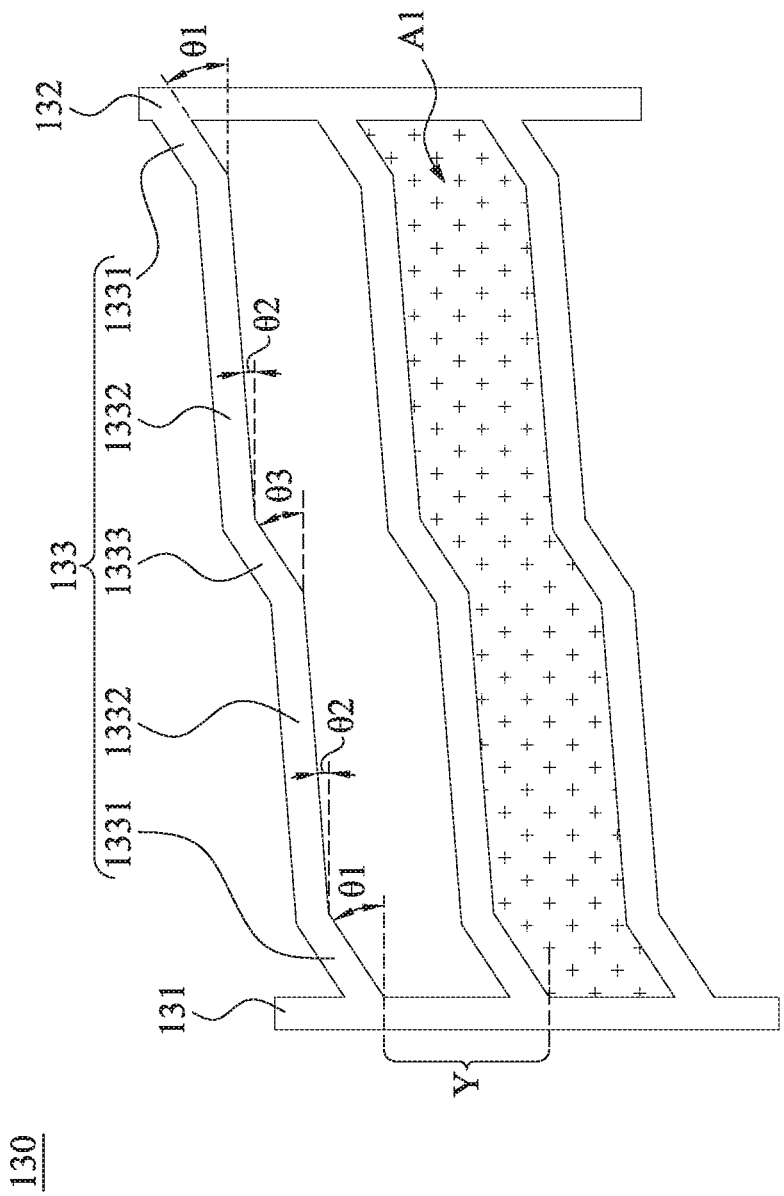
FIG. 1C is a top view of the third electrode layer shown in FIG. 1A.

FIG. 1C is a top view of the third electrode layer 130 shown in FIG. 1A. As shown in FIG. 1C, the third electrode layer 130 includes a third main body portion 131, a fourth main body portion 132, and a third branch portion 133. The third main body portion 131 extends in the first direction D1, and the fourth main body portion 132 is parallel to the third main body portion 131 and also extends in the first direction D1. The third branch portion 133 connects the third main body portion 131 to the fourth main body portion 132.

As shown in FIG. 1C, the third branch portion 133 of the third electrode layer 130 includes a first connecting segment 1331, a second connecting segment 1332, and a third connecting segment 1333. The first connecting segment 1331 is connected to the third main body portion 131 or the fourth main body portion 132. The second connecting segment 1332 is connected to the first connecting segment 1331. The third connecting segment 1333 is connected to the second connecting segment 1332.

As shown in FIG. 1C, the third branch portion 133 may include a plurality of first connecting segments 1331 and a second connecting segment 1332. As shown in FIG. 1C, the two first connecting segments 1331 are respectively connected to the third main body portion 131 and the fourth main body portion 132, and the two second connecting segments 1332 are respectively connected to the two first connecting segments 1331. The third connecting segment 1333 is connected between the two second connecting segments 1332.

As shown in FIG. 1C, the third electrode layer 130 includes a plurality of third branch portions 133. Each of the third branch portions 133 is connected between the third main body portion 131 and the fourth main body portion 132. As a result, the third main body portion 131, the fourth main body portion 132, and the two adjacent third branch portions 133 together surround to form the opening A1.

As shown in FIG. 1C, the adjacent two third branch portions 133 are apart from each other by a distance Y. The distance Y may refer to the distance between the bottoms of the first connection segments 1331 of the adjacent two third branch portions 133 in the first direction D1. In some embodiments, the distance Y may also refer to the distance between the centers of gravity of the adjacent two third branch portions 133. The distance Y in FIG. 1C is substantially equal to the distance Y in FIG. 1B. As a result, as shown in FIG. 1A, each of the openings A1 may include two openings A2 after the third electrode layer 130 overlaps the second electrode layer 120.

As shown in FIG. 1C, a first acute angle θ1 is between the first connecting segments 1331 and the second direction D2. A second acute angle θ2 is between the second connecting segments 1332 and the second direction D2. A third acute angle θ3 is between the third connecting segments 1333 and the second direction D2. In FIG. 1C, specific values of the first acute angle θ1, the second acute angle θ2, and the third acute angle θ3 may be adjusted in accordance with the second electrode layer 120 shown in FIG. 1B.

As shown in FIG. 1A and FIG. 1C, the third connecting segments 1333 are entirely within the region of the second electrode layer 120. Specifically, the third connecting segments 1333 can be completely located within the range of the second main body portion 122 and the second branch portion 124 of the second electrode layer 120 by adjusting the value of the third acute angle θ3.

As shown in FIG. 1A and FIG. 1C, in the present embodiment, the first main body portion 121 overlaps the third main body portion 131 or the fourth main body portion 132, and the distance between the two first main body portions 121 is approximately equal to the distance between the third main body portion 131 and the fourth main body portion 132, and the second main body portion 122 is located at the center of the two first main body portions 121. In this way, the third connecting segment 1333 can be located near the second main body portion 122.

On the other hand, most of the second connecting segments 1332 are located within the range of the second electrode layer 120 and only the gap between the first branch portion 123 and the second branch portion 124 exceeds the range of the second electrode layer 120. For example, referring to FIG. 1A and FIG. 1C, the second connecting segments 1332 can be connected between the top side 1234 and the top side 1244 by adjusting the value of the second acute angle θ2 without any side (1232, 1233, 1242 or 1243 shown in FIG. 1B) exceeds the range of the second electrode layer 120.

In the present embodiment, the first acute angle θ1 is greater than the second acute angle θ2, and the third acute angle θ3 is greater than the second acute angle θ2. On the other hand, the first acute angle θ1 may be greater than, equal to, or less than the third acute angle θ3. Specifically, the first acute angle θ1 and the third acute angle θ3 may be between 10° and 45°. The second acute angle θ2 may be between 5° and 25°.

Similarly, most of the first connecting segments 1331 are located within the range of the second electrode layer 120, and only a portion of the first connecting segments 1331 cut through the first side 1232 (referring to FIG. 1B). This tangent line C may slightly round the corner of the opening A2. Specifically, the angle of the tangent line C can be adjusted by adjusting the first acute angle θ1.

With the above design principles regarding the first electrode layer 110, the second electrode layer 120, and the third electrode layer 130, the opening A1 and the opening A2 located in the opening A1 can be formed in the pixel structure 100. A certain inclined angle is between the opening A1 as a whole and the second direction D2, which is advantageous for improving the image quality of the side view of the pixel structure 100. That is to say, this design increases the viewing angle of the pixel structure 100. In addition, the edge of the opening A2 has the tangent line C, which can improve the distribution stability of the voltage flux when the pixel structure 100 switches to the second mode.

Figure 2A:
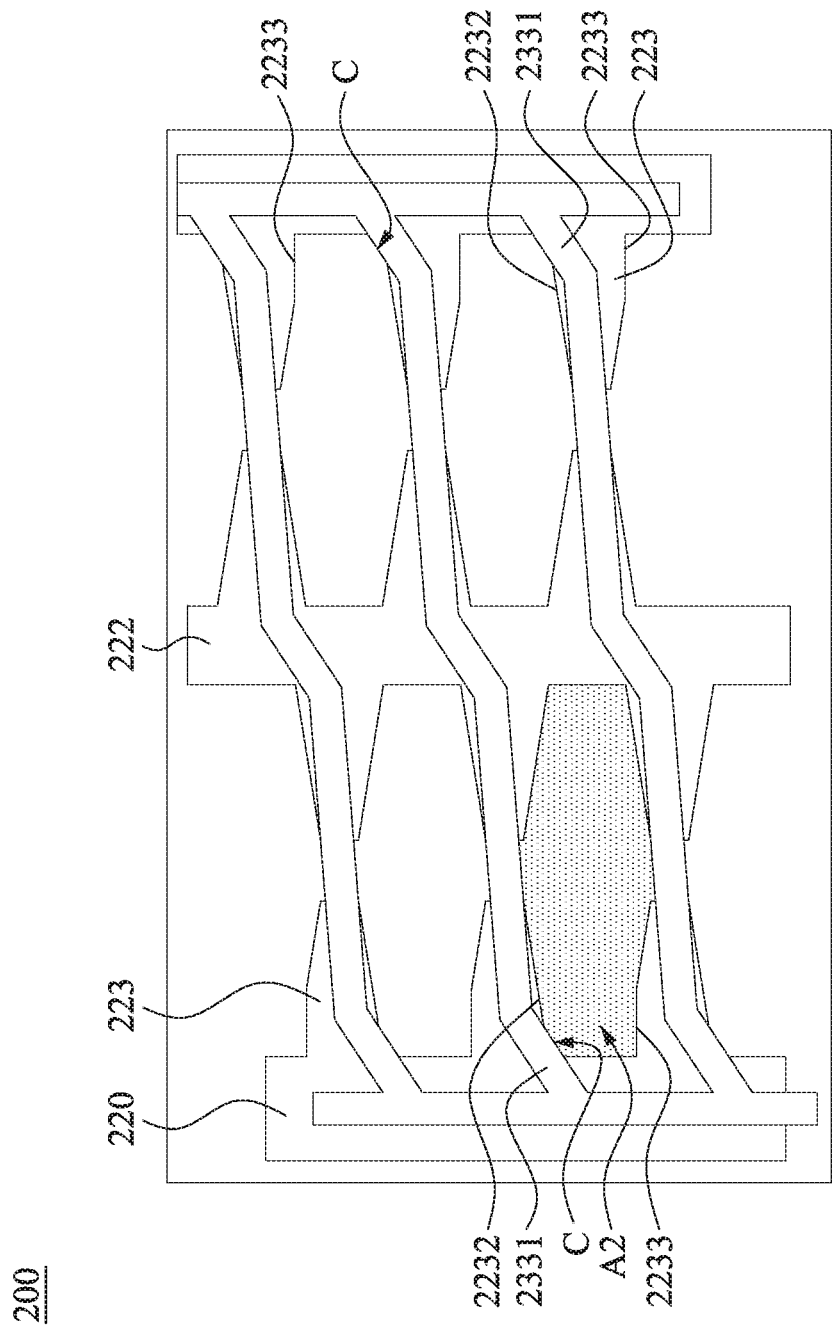
FIG. 2A is a top view of a pixel structure according to another embodiment of the present disclosure.
Figure 2B:
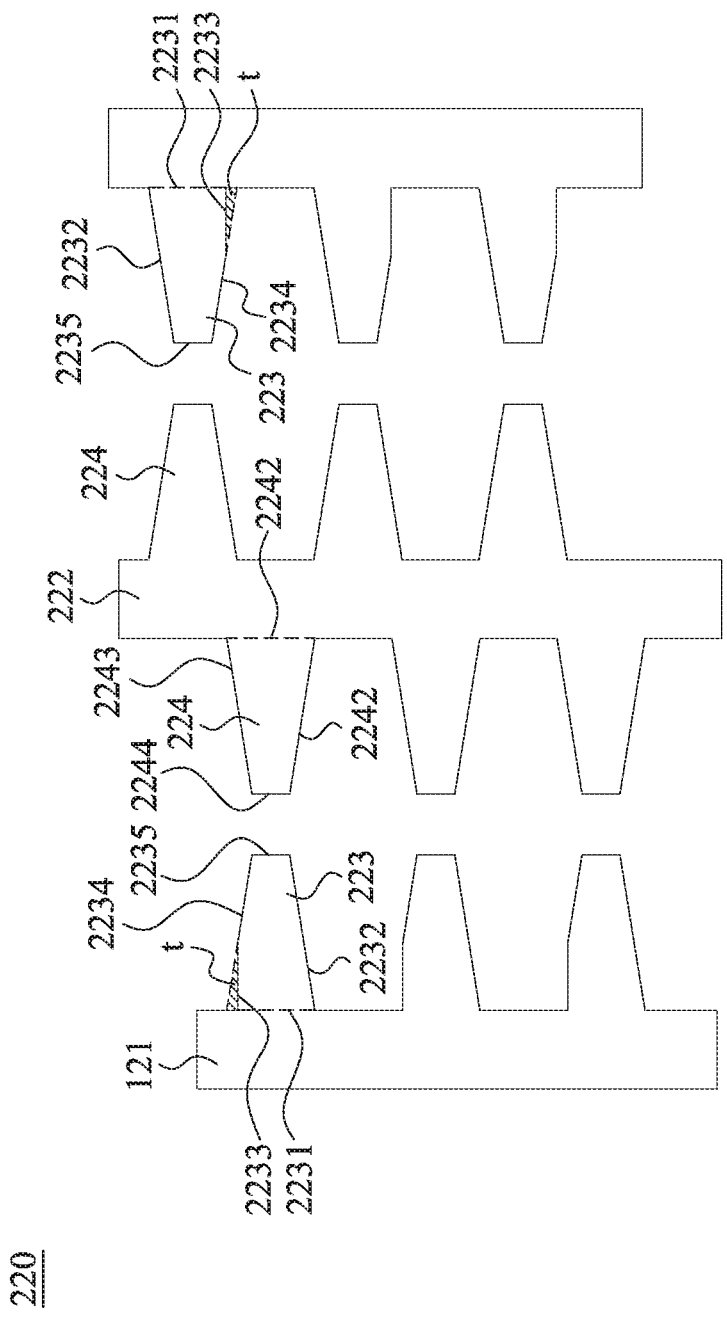
FIG. 2B is a top view of the second electrode layer shown in FIG. 2A.

FIG. 2A is a top view of a pixel structure 200 according to another embodiment of the present disclosure. FIG. 2B is a top view of the second electrode layer 220 shown in FIG. 2A. Most of the elements in the pixel structure 200 are identical to the elements in the pixel structure 100, and the beginning of the label of each corresponding element is changed from 1 to 2. The difference between the pixel structure 100 and the pixel structure 200 is that the first branch portion 223 in the pixel structure 200 is a pentagon, and the first branch portion 123 in the pixel structure 100 is a trapezoid.

As shown in FIG. 2B, the first branch portion 223 is a pentagon having a bottom side 2231, a first side 2932, a second side 2233, a third side 2234, and a top side 2235. The bottom side 2231 is parallel to the first direction D1 and is connected to the first main body portion 121. The top side 2235 is parallel to the bottom side 2231. The first side 2232 is connected between the bottom side 2231 and the top side 2235. The second side 2233 is parallel to the second direction D2 and is connected to the bottom side 2231. The third side 2234 is connected between the second side 2233 and the top side 2235.

As shown in FIG. 2B, the first branch portion 223 differs from the first branch portion 123 (shown FIG. 1B) in that the first branch portion 223 lacks a region of the right-angled triangle t. That is to say, the first branch portion 223 and the second branch portion 224 are partially symmetrical. Specifically, the first side 2232 is symmetrical to the first side 2242, and the top side 2235 is symmetrical to the top side 2244. The bottom side 2231 is symmetrical to a portion of the bottom side 2241, and the third side 2234 is symmetrical to a portion of the second side 2243. This design makes the area of the first branch portion 223 smaller than the area of the second branch portion 224 in the pixel structure 200 (the deviation is the area of the right-angled triangle t).

As shown in FIG. 2A, the tangent line C and the second side 2233 are located on opposite sides of the opening A2. That is to say, the tangent line C does not overlap the second side 2233. In the present embodiment, since the opening A1 as a whole is inclined from the lower left side to the upper right side of the drawing surface, in one opening A1, the tangent line C is located at the upper left side of the left opening A2 and the lower right side of the right opening A2, respectively, and the second sides 2233 are respectively located at the lower left side of the left opening A2 and the upper right side of the right opening A2, but the present disclosure is not limited in this regard. For example, when the inclined direction of the opening A1 is opposite, the above orientation is also changed.

Comparing FIG. 1A to FIG. 2A, it is shown that the above design makes the area of the opening A2 in the pixel structure 200 larger than the area of the opening A2 in the pixel structure 100, which is advantageous for increasing the aperture ratio of the pixel structure 200 under the second mode.

Figure 3A:
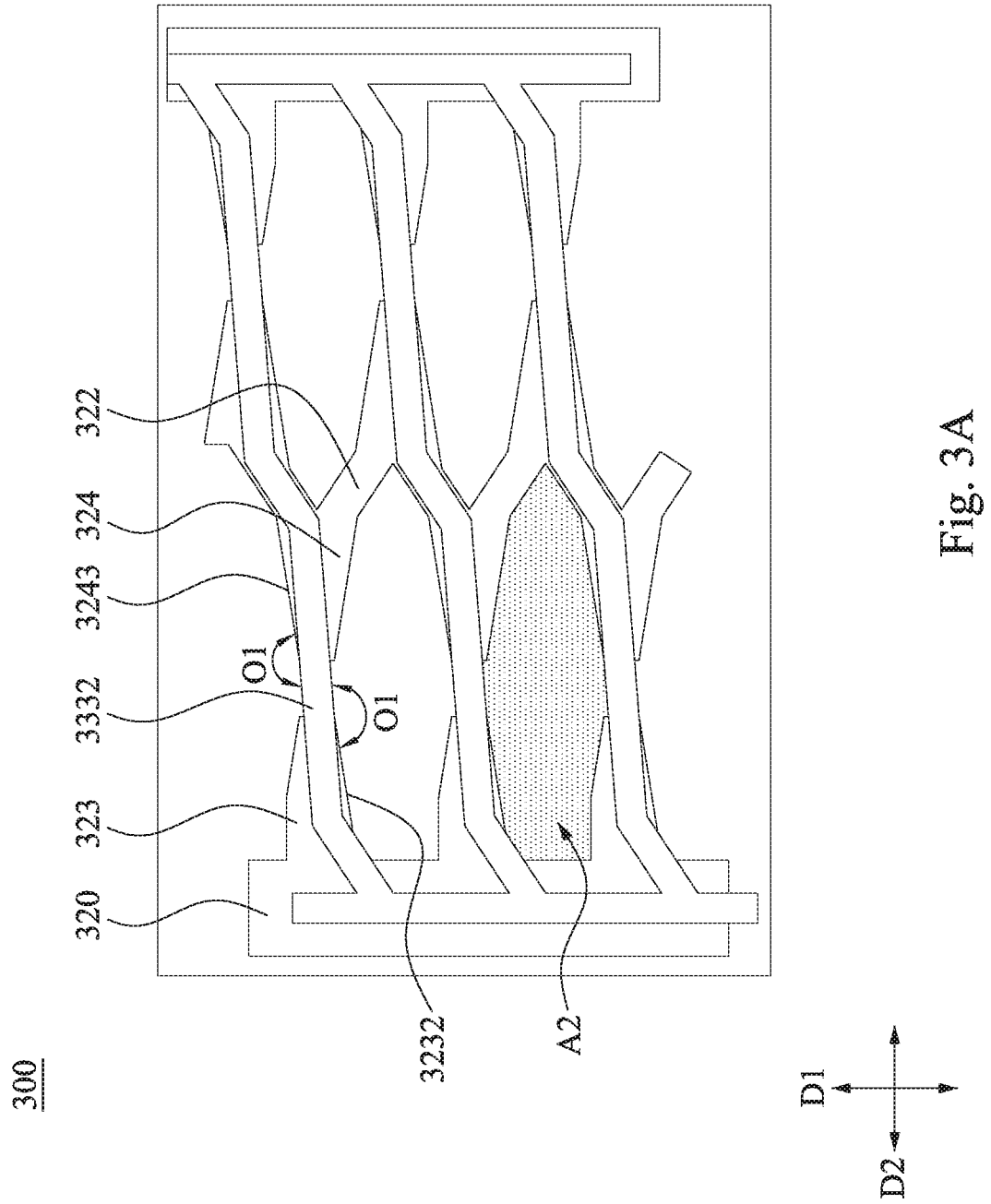
FIG. 3A is a top view of a pixel structure according to another embodiment of the present disclosure.
Figure 3B:
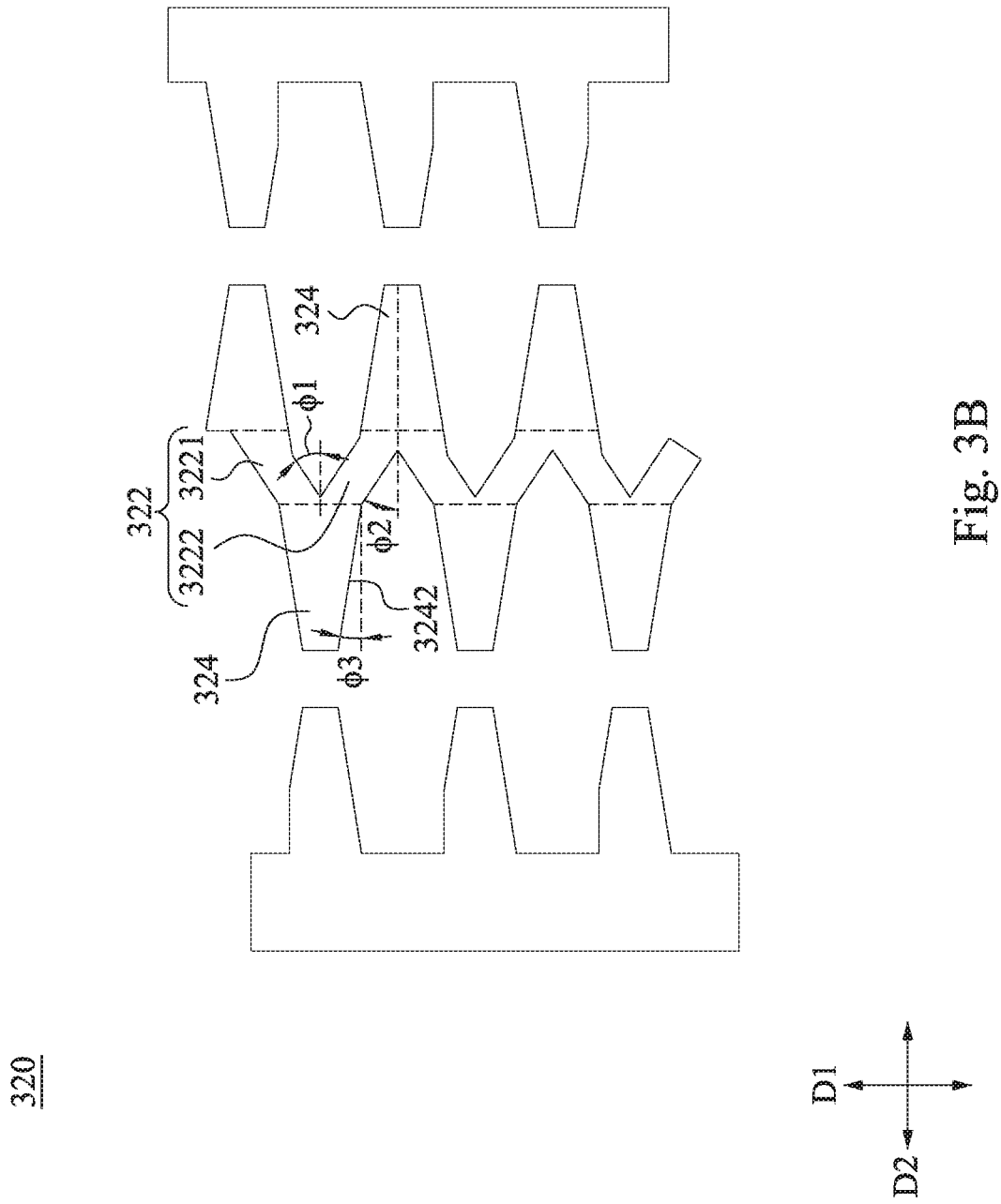
FIG. 3B is a top view of the second electrode layer shown in FIG. 3A.

FIG. 3A is a top view of a pixel structure according to another embodiment of the present disclosure. FIG. 3B is a top view of the second electrode layer shown in FIG. 3A. Most of the elements in the pixel structure 300 are identical to the elements in the pixel structure 200, and the beginning of the label of each corresponding element is changed from 2 to 3. The difference between the pixel structure 300 and the pixel structure 200 is that the second main body portion 322 in the pixel structure 300 includes a plurality of first inclined segments 3221 and a plurality of second inclined segments 3222.

As shown in FIG. 3B, the first inclined segment 3221 and the second inclined segment 3222 are interconnected alternatively such that the second main body portion 322 is formed in a zigzag shape. A first acute angle Φ1 is between the bottom side of the first inclined segment 3221 and the second direction D2. A second acute angle Φ2 is between the bottom side of the second inclined segment 3222 and the second direction D2. In the present embodiment, the first acute angle Φ1 is equal to the second acute angle Φ2.

As shown in FIG. 3B, the second branch portion 324 is simultaneously connected to the first inclined segment 3221 and the second inclined segment 3222. That is to say, the second branch portion 324 is located at a junction of the first inclined segment 3221 and the second inclined segment 3222.

In the present embodiment, a third acute angle Φ3 is between the first side 3242 of the second branch portion 324 and the second direction D2. The first acute angle Φ1 and the second acute angle Φ2 are both greater than the third acute angle Φ3. Specifically, in the present embodiment, the first acute angle Φ1 and the second acute angle Φ2 may be between 5° and 45°. The third acute angle Φ3 may be between 2° and 45°.

Comparing FIG. 3A to FIG. 2A, it's shown that the area occupied by the second main body portion 322 is smaller than the area occupied by the second main body portion 222. That is to say, the above design makes the area of the opening A2 in the pixel structure 300 larger than the area of the opening A2 in the pixel structure 200, which is advantageous for increasing the aperture ratio of the pixel structure 300 in the second mode.

It should be understood that the aperture ratio of the opening A2 can be changed by adjusting the values of the first acute angle Φ1 and the second acute angle Φ2. In the present embodiment, the first acute angle Φ1 and the second acute angle Φ2 are approximately equal to 45°, but the present disclosure is not limited in this regard. Reference may be made herein to Table 2 below, which lists the values of the light transmission efficiency (T %) corresponding to different values of the first acute angle Φ1 and the second acute angle Φ2.

TABLE 2

| Φ1 = Φ2 | T % |
| --- | --- |
| 90° | 100% |
| 45° | 102.4% |
| 20° | 104.2% |
| 10° | 104.1% |

As shown in Table 2, when the first acute angle Φ1 is equal to the second acute angle Φ2 which is 90° (i.e., as shown in FIG. 2B, the second main body portion 222 is generally a straight line), the light transmission efficiency is set to 100%. When the first acute angle Φ1 and the second acute angle Φ2 are less than 45°, the light transmission efficiency is greater than 100%. That is to say, the design of FIG. 3A and FIG. 3B makes the pixel structure 300 have better light transmission efficiency.

Figure 4B:
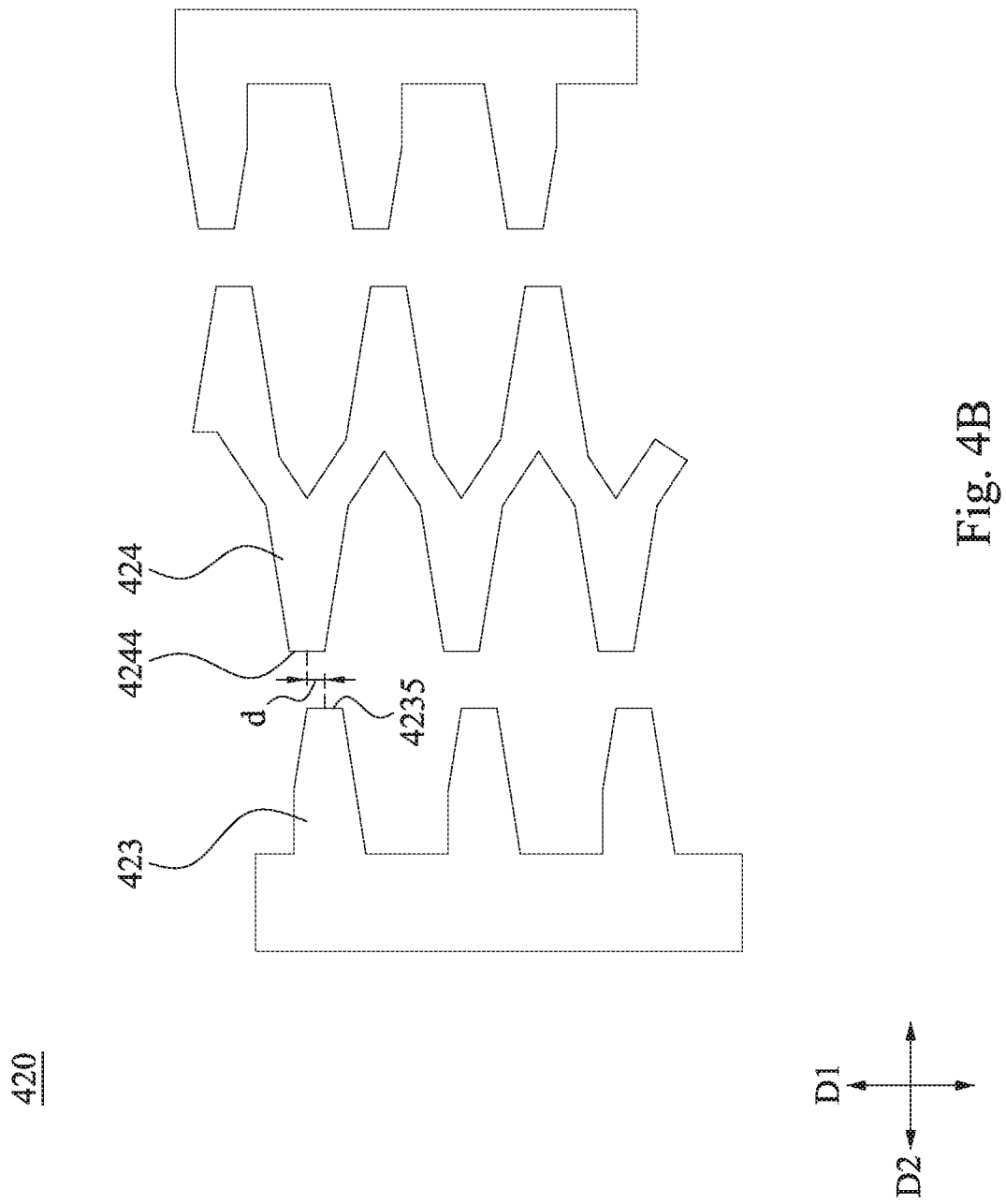
FIG. 4B is a top view of the second electrode layer shown in FIG. 4A.

FIG. 4A is a top view of a pixel structure 400 according to another embodiment of the present disclosure. FIG. 4B is a top view of the second electrode layer 420 shown in FIG. 4A. Most of the elements in pixel structure 400 are identical to the elements in pixel structure 300, and the beginning of the label of each corresponding element is changed from 3 to 4. The difference between the pixel structure 400 and the pixel structure 300 is that the first branch portion 423 and the second branch portion 424 in the pixel structure 400 are staggered. That is to say, the first branch portion 423 is not aligned with the second branch portion 424.

As shown in FIG. 4B, the center of the top side 4235 of the first branch portion 423 is not aligned with the center of the top edge 4244 of the second branch portion 424, and the two are shifted by a distance d in the first direction D1.

Return to FIG. 3A. As shown in FIG. 3A, the second connecting segment 3332 is connected to the first side 3232 of the first branching portion 323, and an obtuse angle O1 is between the second connecting segment 3332 and the first side 3232. On the other hand, the second connecting segment 3332 is connected to the second side 3243 of the second branching portion 324, and an obtuse angle O1 is between the second connecting segment 3332 and the second side 3243.

In contrast, in FIG. 4A, since the first branch portion 423 and the second branch portion 424 are shifted by the distance d, the relative position between the second connecting segment 4332, the first branch portion 423, and the second branch portion 424 changes. For example, in the present embodiment, the second connecting segment 4332 is connected to the third side 4234, and an obtuse angle O2 is between the second connecting segment 4332 and the third side 4234. On the other hand, the second connecting segment 4332 is connected to the first side 4242, and an obtuse angle O2 is between the second connecting segment 4332 and the first side 4242.

As shown in FIG. 3A and FIG. 4A, the profile of the opening A2 can be adjusted by adjusting the distance d between the first branch portions 323, 423 and the second branch portions 324, 424. The profile of opening A2 affects the distribution of voltage flux when the pixel structure 400 is under the second mode. A more uniform voltage flux distribution is advantageous for the uniformity and stability of the light output from the pixel structure 400, and a person of ordinary skill in the art can select an appropriate distance d according to practical needs.

Figure 5:
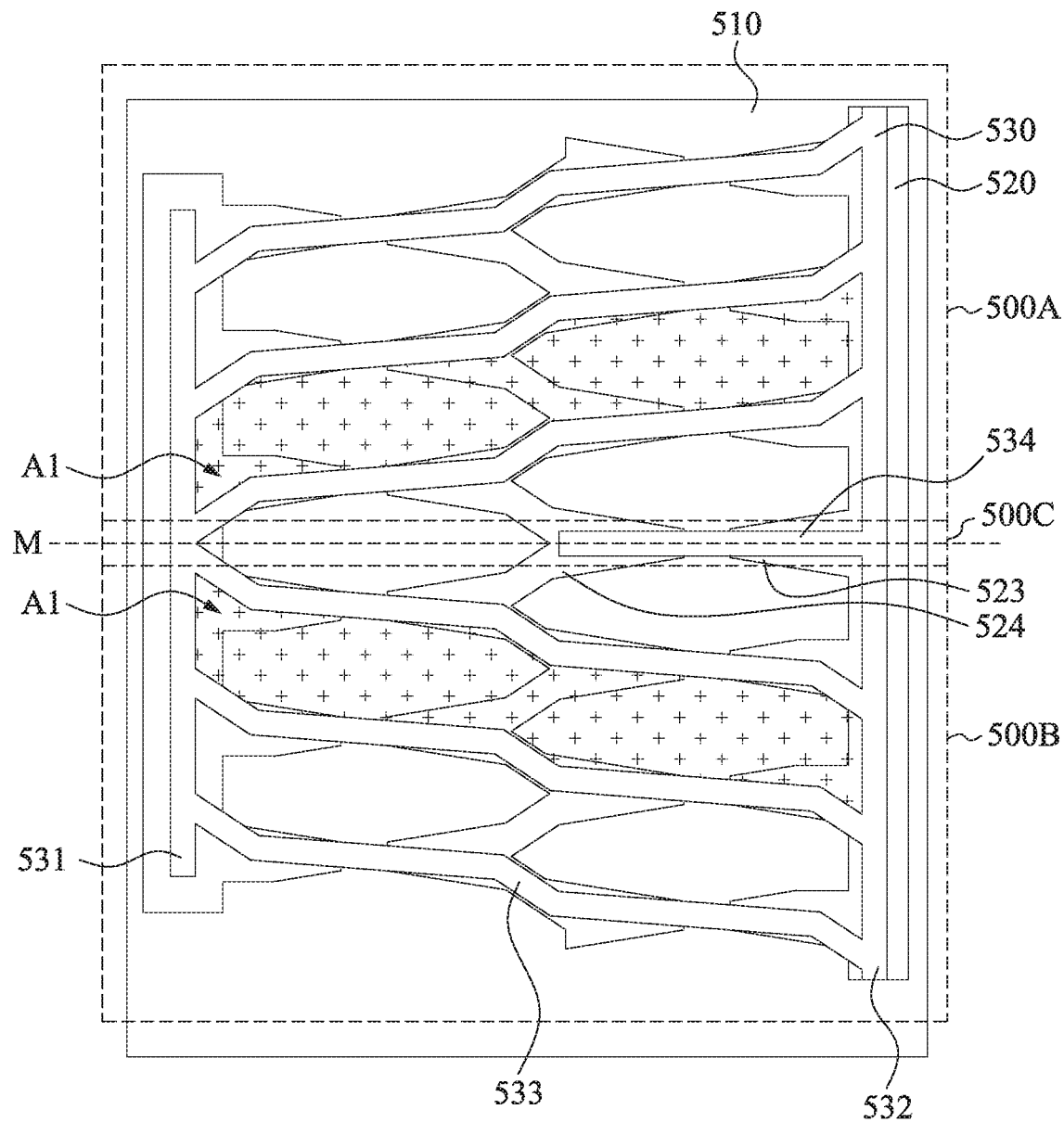
FIG. 5 is a top view of a pixel structure according to another embodiment of the present disclosure.

FIG. 5 is a top view of a pixel structure 500 according to another embodiment of the present disclosure. As shown in FIG. 5, the pixel structure 500 includes a first electrode layer 510, a second electrode layer 520, and a third electrode layer 530. The pixel structure 500 can be divided into a first region 500A and a second region 500B, and the first region 500A and the second region 500B are arranged in the first direction D1. The first electrode layer 510, the second electrode layer 520, and the third electrode layer 530 in the first region 500A constitute the pixel structure 400 as shown in FIG. 4A, and the first electrode layer 510, the second electrode layer 520, and the third electrode layer 530 in the second region 500B are symmetrical to the pixel structure 400 in the first region 500A about the symmetry axis M.

It should be understood that in the present embodiment, the first region 500A and the second region 500B in the pixel structure 500 are adopted identically to the pixel structure 400 of FIG. 4A. However, in other embodiments, the pixel structure 100 of FIG. 1A, the pixel structure 200 of FIG. 2A, or the pixel structure 300 of FIG. 3A may be adopted.

As shown in FIG. 5, the first electrode layer 510 is substantially equal to the first electrode layer 410 in FIG. 4A, which is a full-pattern electrode. The second electrode layer 520 is substantially equal to the second electrode layer 420 in FIG. 4B. In the first region 500A and the second region 500B, the third electrode layer 530 is substantially equal to the third electrode layer 430 in FIG. 4A.

As shown in FIG. 5, the pixel structure 500 further includes a third region 500C between the first region 500A and the second region 500B. The third region 500C is located on the symmetry axis M. In the third region 500C, the third electrode layer 530 further includes a protruding segment 534. The protruding segment 534 protrudes from the fourth main body portion 532 and extends from the first branch portion 523 to above the second branch portion 524 of the second electrode layer 520. In the present embodiment, the protruding segment 534 is parallel to the second direction D2, and the protruding segment 534 is a rectangle. In other embodiments, the protruding segment 534 can be of various geometric shapes that are symmetrical about the symmetry axis M, such as rectangles, ellipse, polygon, and the like.

As shown in FIG. 5, the pixel structure 500 as a whole is symmetrical about the symmetry axis M, and the opening A1 in the first region 500A and the opening A1 in the second region 500B have opposite inclined directions. When the pixel structure 500 is under the first mode, this configuration allows the observer to observe uniform optical characteristics when viewing the pixel structure 500 from different viewing angles. That is to say, this configuration enables the pixel structure 500 to achieve a wide viewing angle characteristic.

Reference is made to Table 3 below. Table 3 is a numerical table which lists the light transmission efficiency (T %), on delay ($T_{on}$), off delay ($T_{off}$), and total delay ($T_{total}$) of the pixel structure 500 under the first mode and the second mode shown in FIG. 5.

TABLE 3

|  | first mode | second mode |
|---|---|---|
| T % | 81.08% | 49.65% |
| $T_{on}$ | 6 ms | 2.38 ms |
| $T_{off}$ | 6 ms | 3.58 ms |
| $T_{total}$ | 12 ms | 5.96 ms |

Figure 6A:
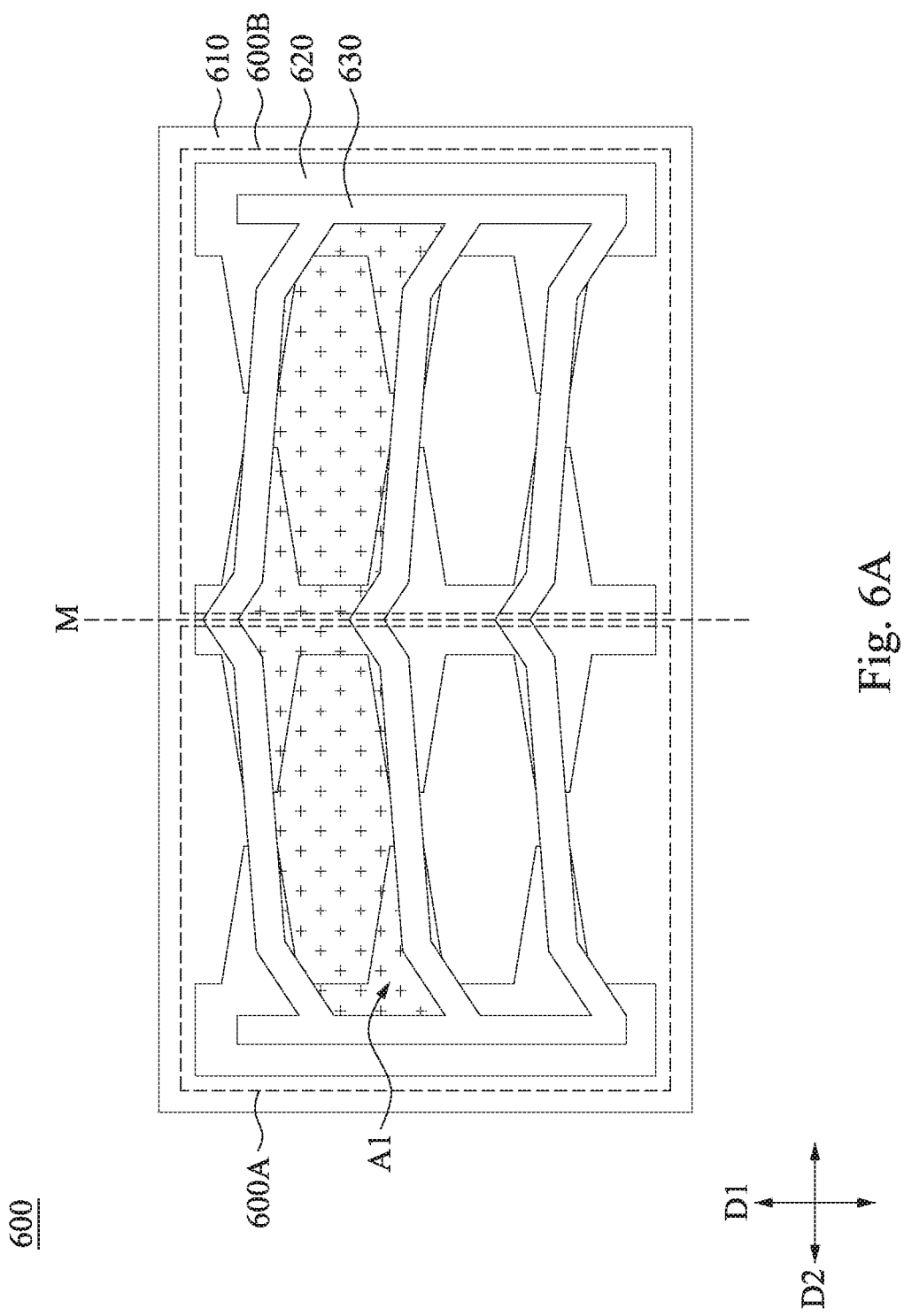
FIG. 6A is a top view of a pixel structure according to another embodiment of the present disclosure.
Figure 6B:
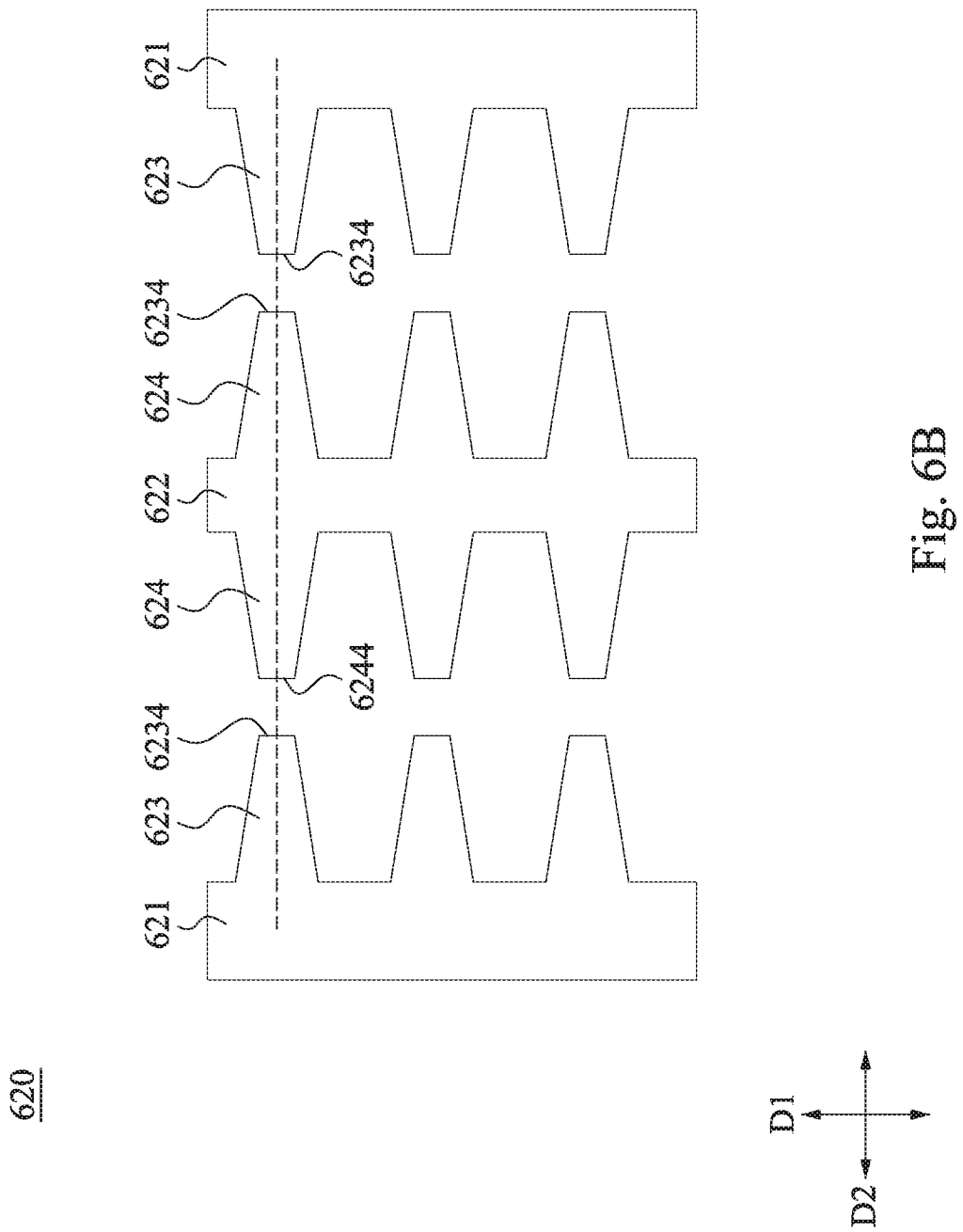
FIG. 6B is a top view of the second electrode layer shown in FIG. 6A.
Figure 6C:
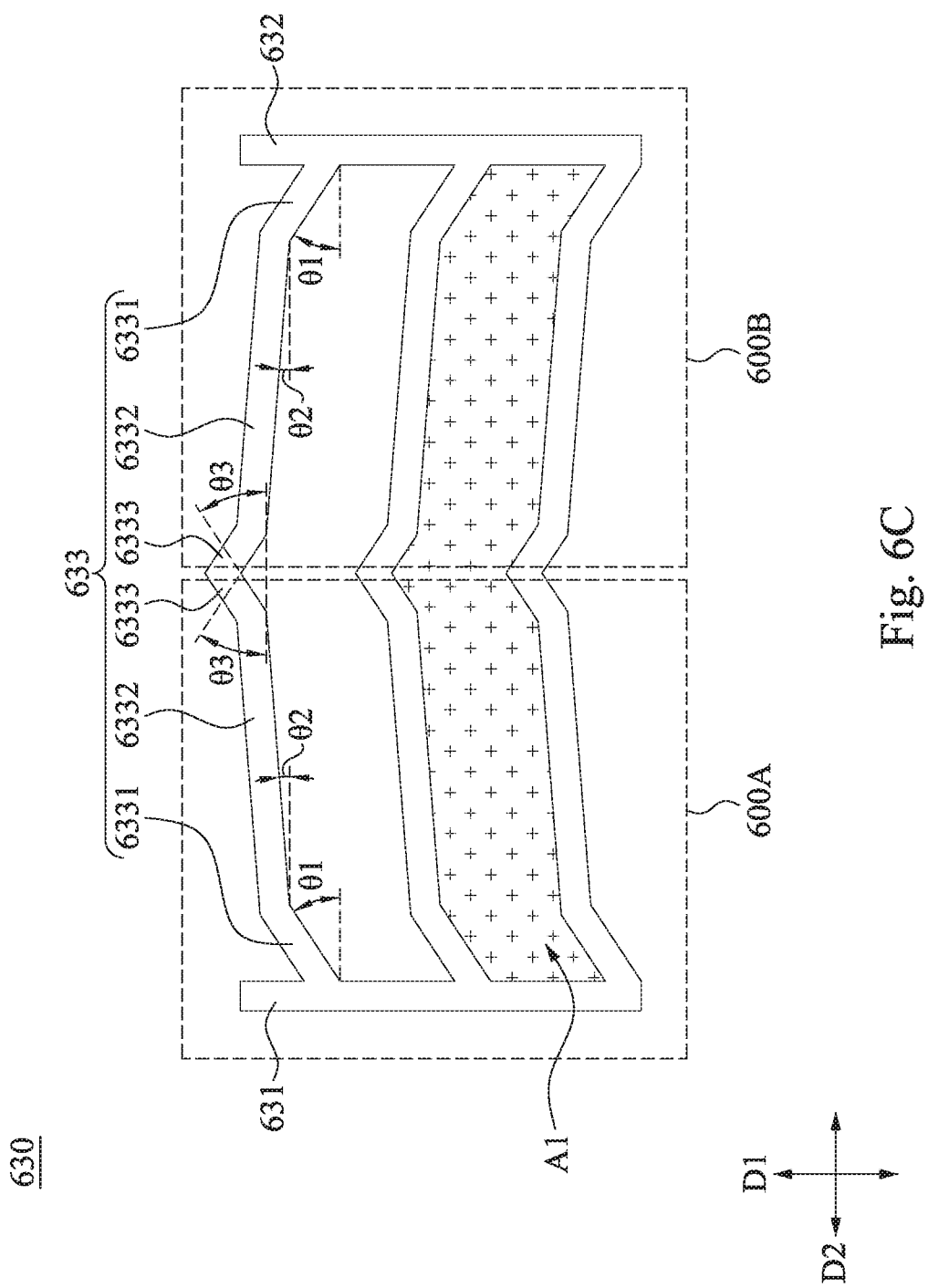
FIG. 6C is a top view of the third electrode layer shown in FIG. 6A.

FIG. 6A is a top view of a pixel structure 600 according to another embodiment of the present disclosure. FIG. 6B is a top view of the second electrode layer 620 shown in FIG. 6A. FIG. 6C is a top view of the third electrode layer 630 shown in FIG. 6A.

As shown in FIG. 6A, the pixel structure 600 includes a first electrode layer 610, a second electrode layer 620, and a third electrode layer 630. The pixel structure 600 can be divided into a first region 600A and a second region 600B, and the first region 600A and the pixel structure 500 are arranged in the second direction D2. The first electrode layer 610, the second electrode layer 620, and the third electrode layer 630 in the first region 600A are symmetrical to the first electrode layer 610, the second electrode layer 620, and the third electrode layer 630 in the second region 600B about the symmetry axis M.

As shown in FIG. 6B, the second electrode layer 620 of the pixel structure 600 is similar to the second electrode layer 120 in FIG. 1B. The difference is that the distance Z in the second electrode layer 120 of FIG. 1B is set to zero to obtain the second electrode layer 620 in FIG. 6B.

As shown in FIG. 6B, in the second electrode layer 620, the center of the top side 1234 of the first branch portion 123 is aligned with the center of the top side 1244 of the second branch portion 124, and the second branch portions 124 located on the opposite side of the second main body portion 122 are aligned with each other (i.e., the distance d in FIG. 4B is set to zero). As shown in FIG. 6, the top side 1234 of one first branch portion 123 simultaneously aligns with the centers of the top sides 1244 of the two second branch portions 124.

As shown in FIG. 6C, the third electrode layer 630 is similar to the third electrode layer 130 in FIG. 1C. The difference is that the arrangement manner and the inclined direction of the first connecting segment 6331, the second connecting segment 6332, and the third connecting segment 6333 of the third branch portion 633 are slightly different.

As shown in FIG. 6C, in the first region 600A, the first connecting segment 6331 is connected to the third main body portion 631, and a first acute angle θ1 is between the third main body portion 631 and the second direction D2. The second connecting segment 6332 is connected to the first connection, and a second acute angle θ2 is between the second connecting segment 6332 and the second direction D2. The third connecting segment 6333 is connected to the second connecting segment 6332, and a third acute angle θ3 is between the third connecting segment 6333 and the second direction D2.

Similarly, in the second region 600B, the first connecting segment 6331 is connected to the fourth main body portion 632, and a first acute angle θ1 is between the fourth main body portion 632 and the second direction D2. The second connecting segment 6332 is connected to the first connecting segment 6331, and a second acute angle θ2 is between the second connecting segment 6332 and the second direction D2. The third connecting segment 6333 is connected to the second connecting segment 6332, and a third acute angle θ3 is between the second connecting segment 6332 and the second direction D2.

As shown in FIG. 6C, the inclined angle of each of the connecting segments in the first region 600A is identical to the inclined angle of each of the connecting segments in the second region 600B, but the inclined directions are opposite to each other. As shown in FIG. 6A, the pixel structure 600 as a whole is symmetrical about the symmetry axis M. The above design makes the opening A1 in the first region 600A have an opposite inclined direction to the opening A1 in the second region 600B. When the pixel structure 600 is under the first mode, this configuration allows the observer to observe uniform optical characteristics when viewing the pixel structure 600 at different viewing angles. That is to say, this configuration enables the pixel structure 500 to achieve a wide viewing angle characteristic.

Reference is made to Table 4 below. Table 4 is a numerical table which lists the light transmission efficiency (T %), on delay ($T_{on}$), off delay ($T_{off}$), and total delay ($T_{total}$) of the pixel structure 500 under the first mode and the second mode shown in FIG. 6A.

TABLE 4

|  | first mode | second mode |
| --- | --- | --- |
| T % | 77.85% | 52.21% |
| $T_{on}$ | 4.5 ms | 3.5 ms |
| $T_{off}$ | 6.3 ms | 3.5 ms |
| $T_{total}$ | 10.8 ms | 7 ms |

Figure 7A:
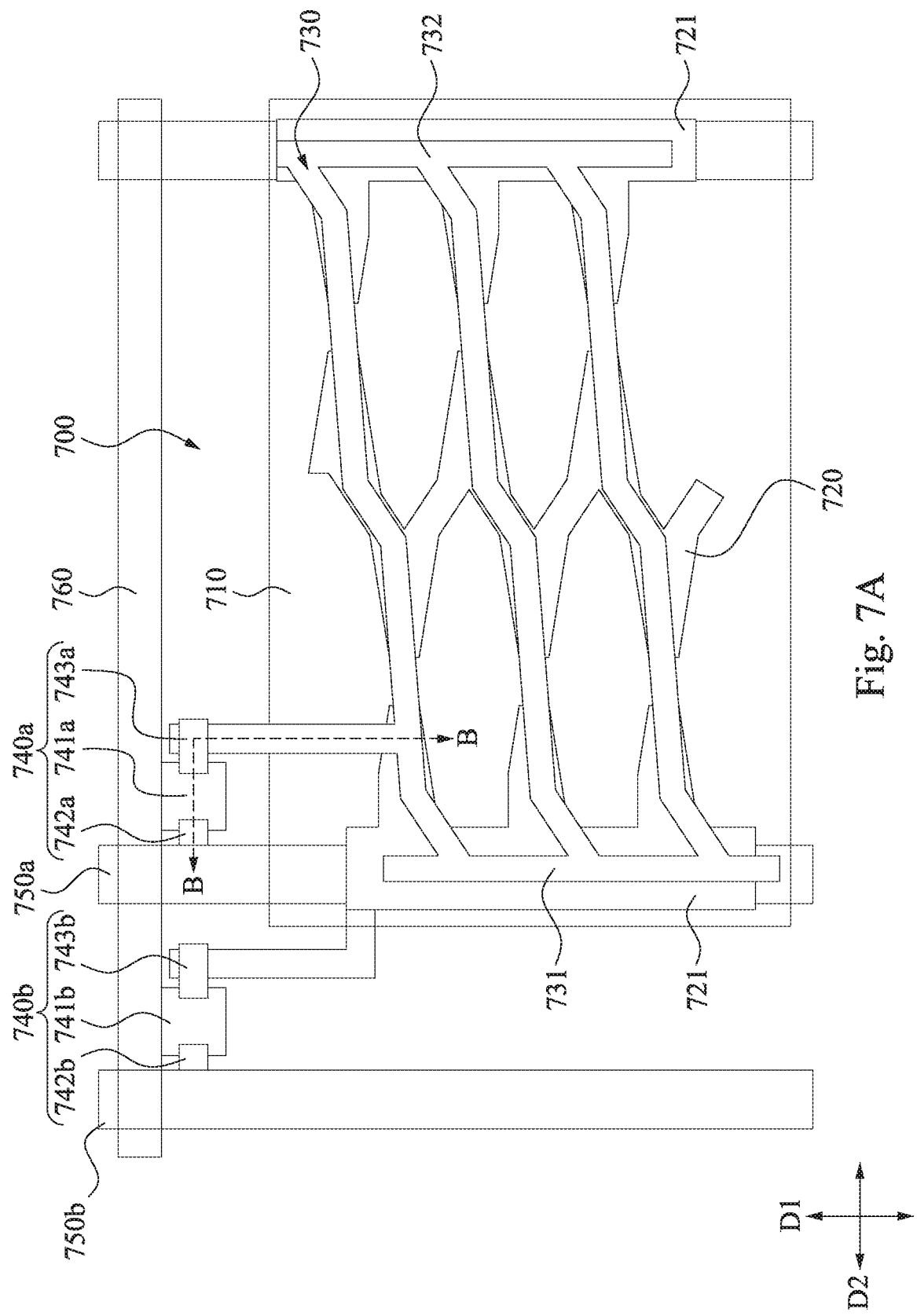
FIG. 7A is a relative relationship diagram of the pixel structure, the switch element, the data line, and the scan line.

FIG. 7A is a relative relationship diagram of the pixel structure 700, the switch element 740a, the data line 750a, and the scan line 760. In the present embodiment, the pixel structure 700 is identical to the pixel structure 400 shown in FIG. 4A. As shown in FIG. 7A, the data line 750a extends in the first direction D1, and the scan line 760 extends in the second direction D2. In one display, a plurality of data lines 750a and a plurality of scan lines 760 define a plurality of pixel regions in an array, and one pixel structure 700 may be disposed in each of the pixel regions.

In some embodiments, the data lines 750a and the scan lines 760 may be disposed opposite to each other. That is to say, the data line 750a may extend in the second direction D2, and the scan line 760 may extend in the first direction D1, but the present disclosure is not limited in this regard.

In the present embodiment, the pixel structure 700 shown in FIG. 4A is disposed in the pixel region surrounded by the data line 750a and the scan line 760. However, in other embodiments, the pixel structure shown in a group consisting of FIG. 1A to FIG. 6A may be disposed in the pixel region.

In the present embodiment, the switch element 740a is a thin film transistor (TFT). The switch element 740a includes a gate 741a, a source 742a, and a drain 743a. The gate 741a is electrically connected to the scan line 760. The source 742a is electrically connected to the data line 750a. The drain 743a is electrically connected to the third electrode layer 730 in the pixel structure 700. When the scan line 760 and the data line 750a simultaneously apply a voltage to the switching element 740a, the drain 743a changes the potential of the third electrode layer 730. That is to say, in the embodiment shown in FIG. 7A, the third electrode layer 730 serves as a pixel electrode of the pixel structure 700, while the first electrode layer 710 can be connected to a common voltage source and serves as a common electrode of the pixel structure 700.

Figure 7B:
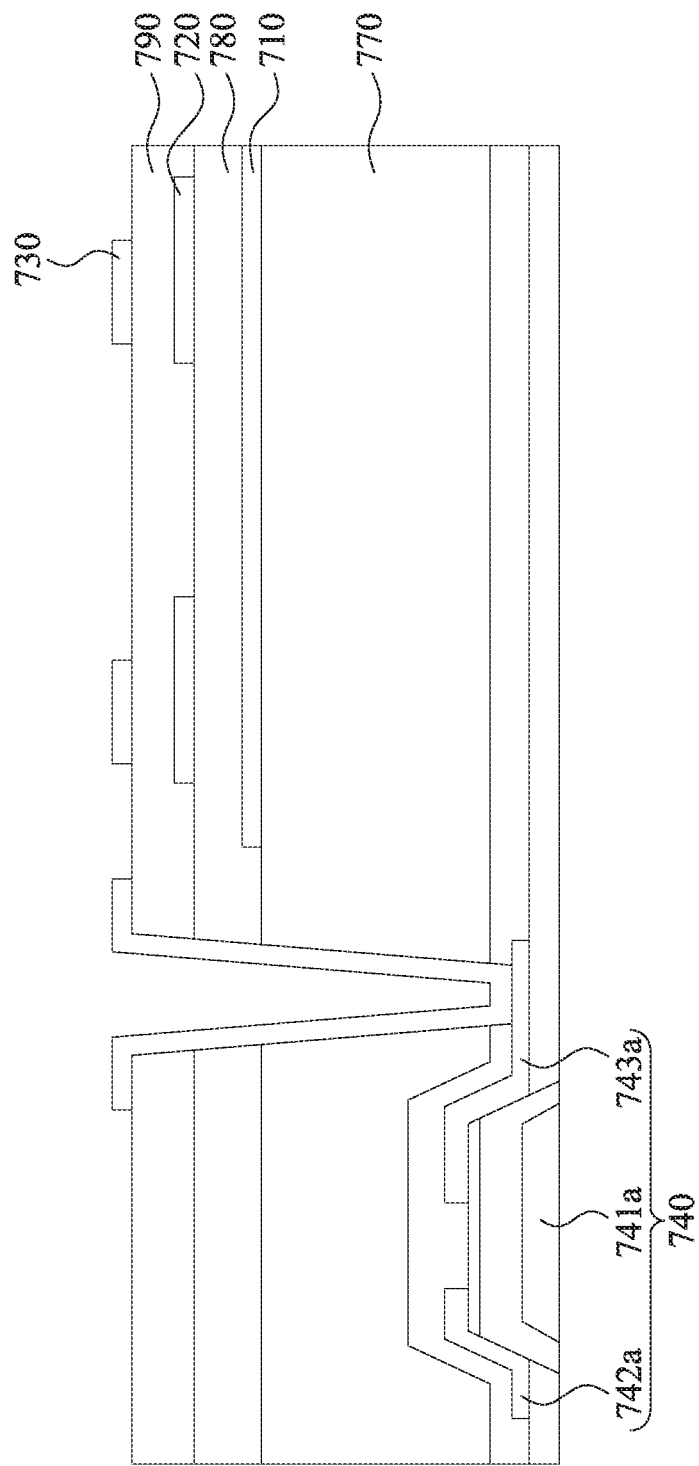
FIG. 7B is a cross-segmental view along line B-B shown in FIG. 7A.

FIG. 7B is a cross-segmental view along line B-B shown in FIG. 7A. As shown in FIG. 7B, the first electrode layer 710 is disposed over the interlayer dielectric 770. The first electrode layer 710 and the second electrode layer 720 are electrically separated by an insulating layer 780, and the second electrode layer 720 and the third electrode layer 730 are electrically separated by an insulating layer 790. The drain 743a and the third electrode layer 730 are electrically connected.

As shown in FIG. 7A, in the present embodiment, another data line 750b and another switch element 740b are further included. The data line 750b is parallel to the data line 750a. The switch element 740b can serve as a potential control structure of the second electrode layer 720. The switch element 740b includes a gate 741b, a source 742b, and a drain 743b. The gate 741b is electrically connected to the scan line 760, the source 742b is electrically connected to the data line 750b, and the drain 743b is electrically connected to the second electrode layer 720. The cross-sectional view of the switch element 740b is similar to that of FIG. 7B, with the difference that the drain 743b of the switch element 740b is electrically connected to the second electrode layer 720, which is not shown here in the drawing.

That is to say, in the present embodiment, the same pixel structure 700 is provided with two switch elements 740a, 740b, and both share the same scan line 760. The switching element 740b can control the potential of the second electrode layer 720 to be equal to the potential of the first electrode layer 710 or the potential of the third electrode layer 730. As such, the pixel structure 700 can switch between the first mode and the second mode.

As shown in FIG. 7A, in the present embodiment, the first electrode layer 710 overlaps the data line 750a, the first main body portion 721 of the second electrode layer 720 overlaps the data line 750a, and the third main body portion 731 and the fourth main body portion 732 of the third electrode layer 730 overlap the data line 750a. That is to say, the first electrode layer 710, the first main body portion 721, the third main body portion 731, and the fourth main body portion 732 overlap each other.

Figure 7C:
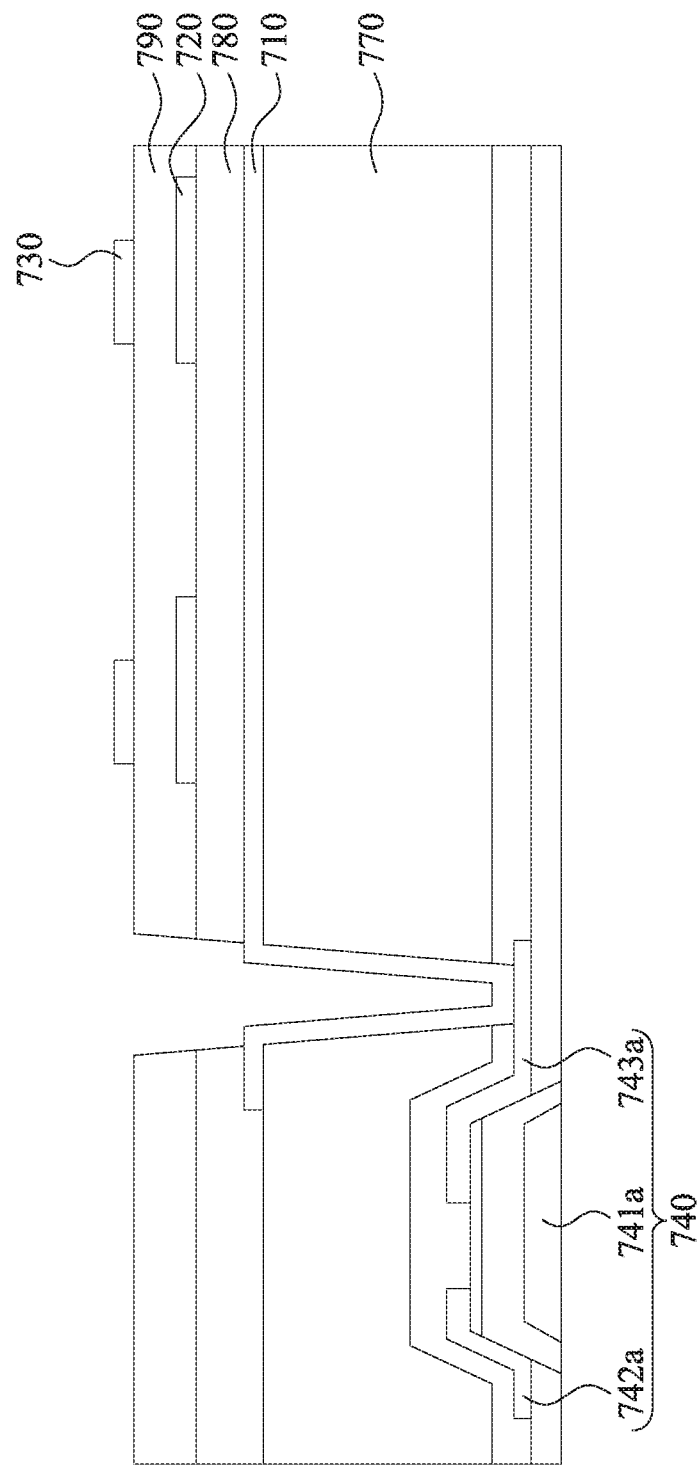
FIG. 7C is a cross-segmental view of a pixel structure according to another embodiment of the present disclosure.

It should be understood that the embodiments shown in FIG. 7A and FIG. 7B are only examples, and the present disclosure is not limited in this regard. For example, FIG. 7C is a cross-sectional view of a pixel structure according to another embodiment of the present disclosure. The cross-sectional position of which is identical to that of FIG. 7B. As shown in FIG. 7C, as mentioned above, the first electrode layer 710 can serve as the pixel electrode of the pixel structure 700 in some embodiments, and thus the drain 743a of the switch element 740a is electrically connected to the first electrode layer 710, while third electrode layer 730 can be connected to a common voltage source and serve as a common electrode for pixel structure 700. When the scan line 760 and the data line 750a simultaneously apply a voltage to the switch element 740a, the drain 743a changes the potential of the first electrode layer 710.

Figure 8:
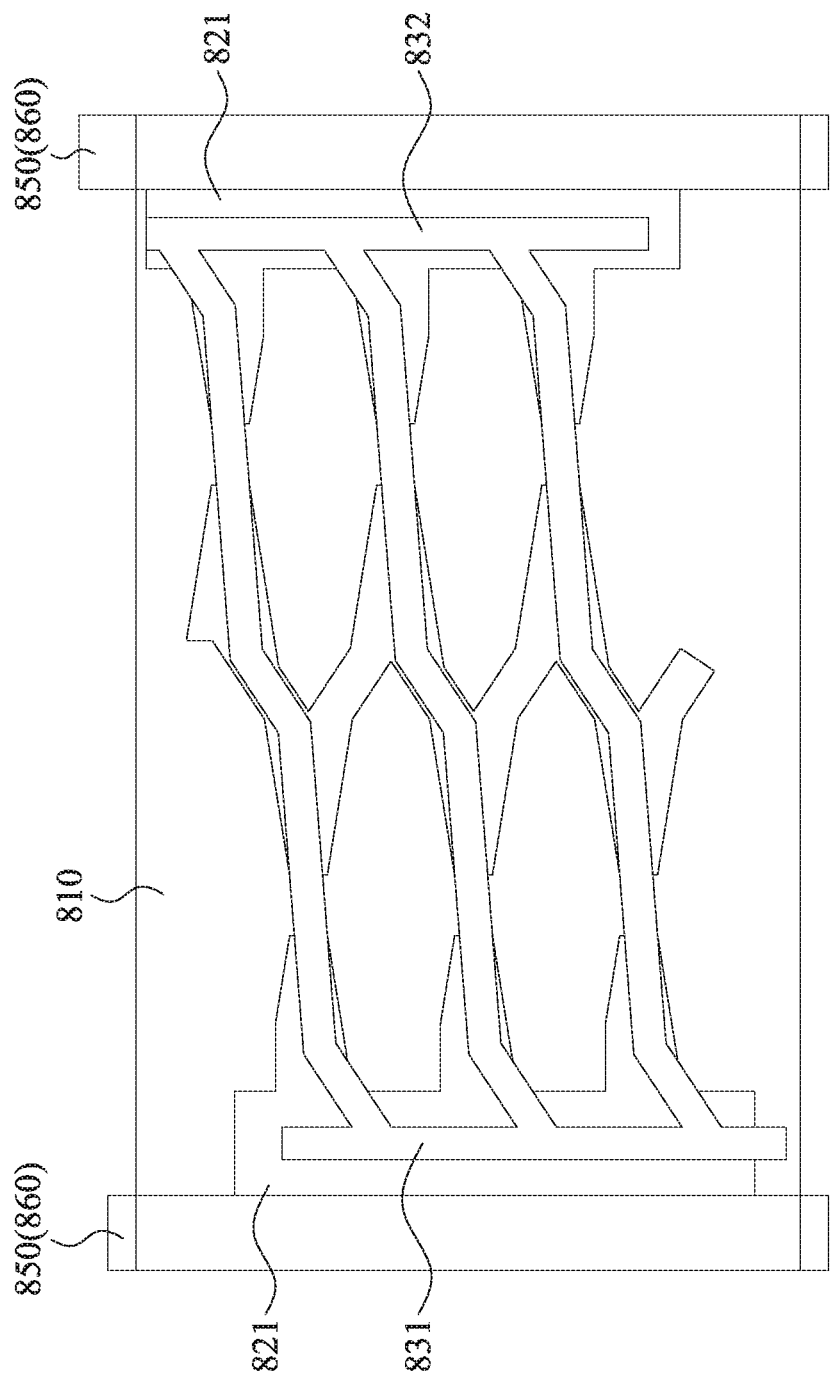
FIG. 8 is a relative relationship diagram of the pixel structure and the data line or the scan line according to another embodiment of the present disclosure.

FIG. 8 is a relative relationship diagram of the pixel structure 800 and the data line 850 or the scan line 860 according to another embodiment of the present disclosure. As shown in FIG. 8, in the present embodiment, the first electrode layer 810 overlaps the data line 850 (or the scan line 860), the first main body portion 821 of the second electrode layer 820 does not overlap the data line 850 (or the scan line 860), and third main body portion 831 and the fourth main body portion 832 of third electrode layer 830 do not overlap the data line 850 (or the scan line 860).

As shown in FIG. 8, in the present embodiment, the first electrode layer 110 can serve as a common electrode. That is to say, all of the pixel structures 800 in the display can share the same first electrode layer 810. On the other hand, the third electrode layer 830 can serve as a pixel electrode of each of the pixel structures 800.

Figure 9:
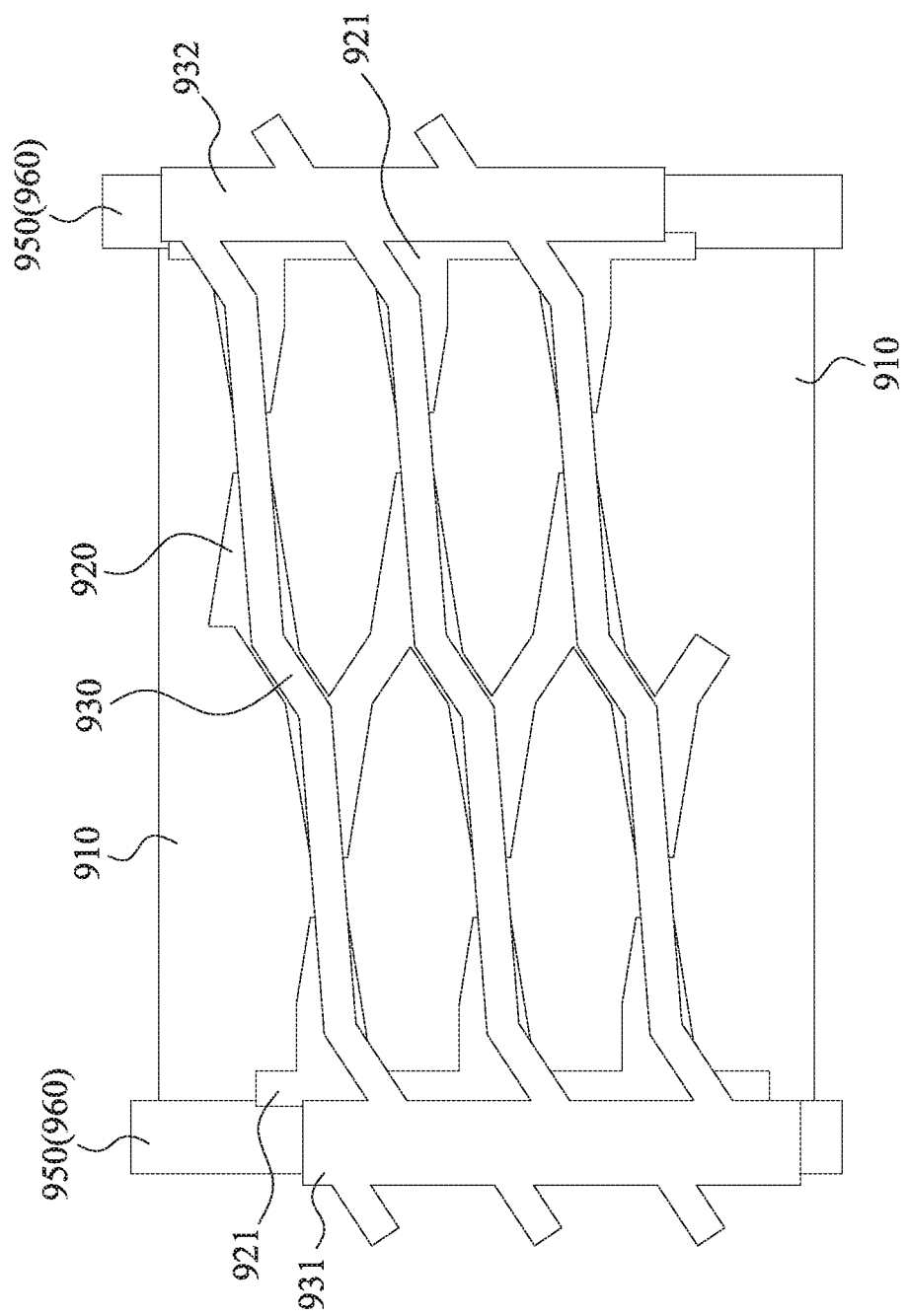
FIG. 9 is a relative relationship diagram of the pixel structure and the data line or the scan line according to another embodiment of the present disclosure.

FIG. 9 is a relative relationship diagram of the pixel structure 900 and the data line 950 or the scan line 960 according to another embodiment of the present disclosure. As shown in FIG. 9, in the present embodiment, the first electrode layer 910 does not overlap the data line 950 (or the scan line 960), the first main body portion 921 of the second electrode layer 920 partially overlaps the data line 950 (or the scan line 960), and the third main body portion 931 and the fourth main body portion 932 of the third electrode layer 930 overlap the data line 950 (or the scan line 960).

As shown in FIG. 9, in the present embodiment, the third electrode layer 930 can serve as a common electrode. That is to say, all of the pixel structures 900 in the display can share the same third electrode layer 930. On the other hand, the first electrode layer 910 can serve as a pixel electrode of each of the pixel structures 900.

Figure 10A:
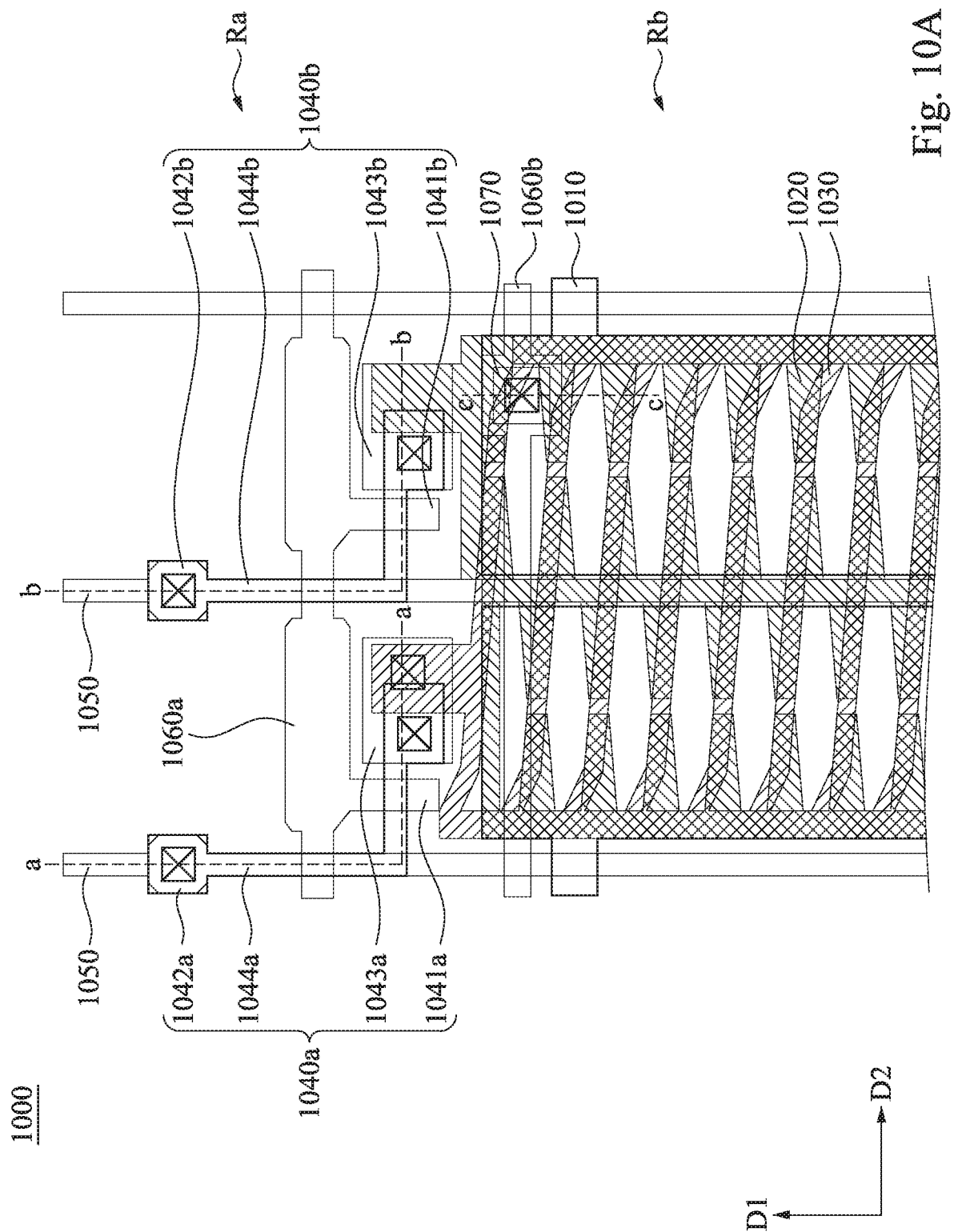
FIG. 10A is a top view of a pixel structure according to another embodiment of the present disclosure.
Figure 10B:
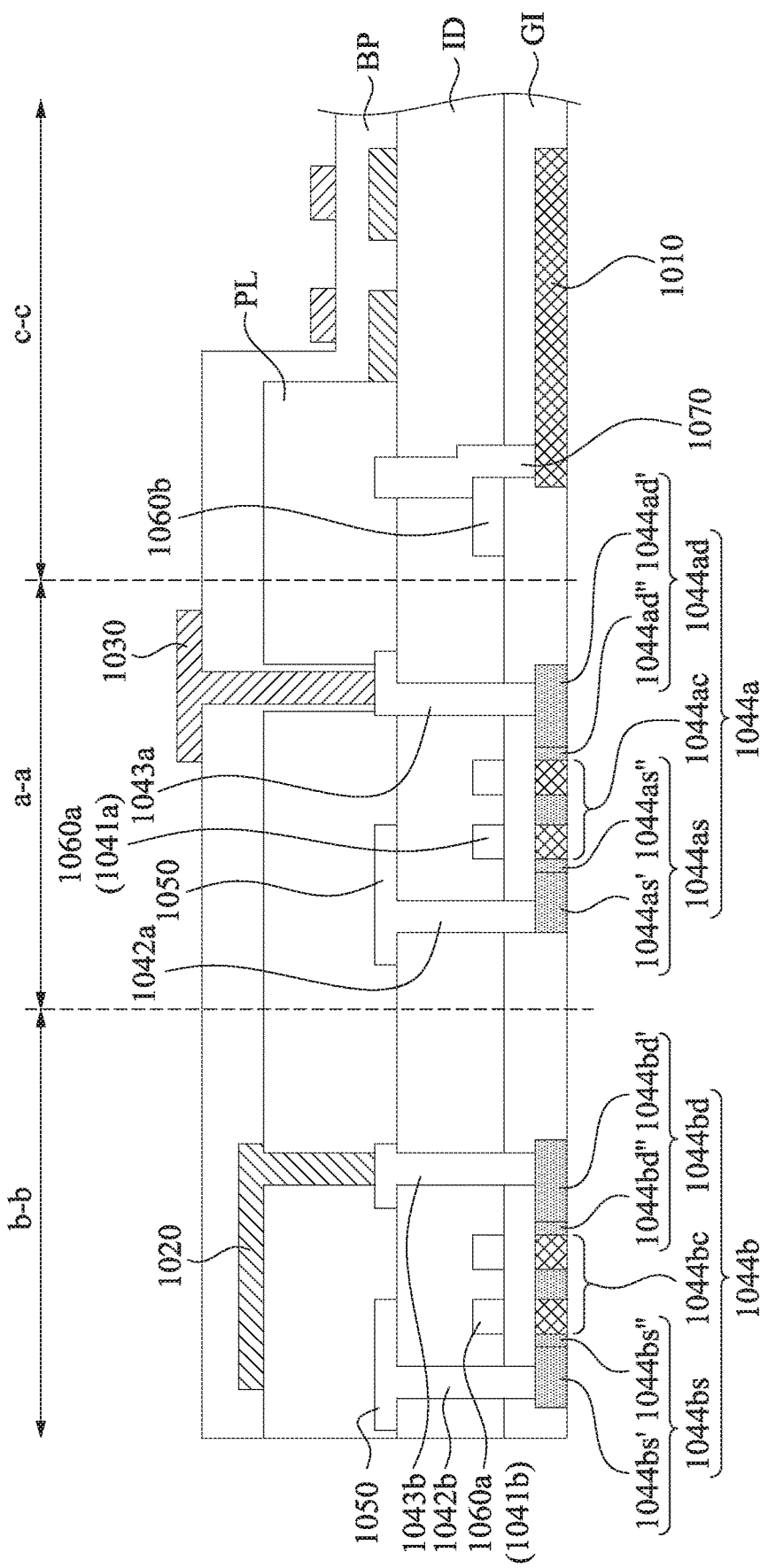
FIG. 10B is a combined cross-sectional view of the pixel structure shown in FIG. 10A along various lines.

FIG. 10A is a top view of a pixel structure 1000 according to another embodiment of the present disclosure. FIG. 10B is a combined cross-sectional view of the pixel structure 1000 shown in FIG. 10A along line a-a, line b-b, and line c-c. It is noted that any of the pixel structures shown in FIG. 1A to FIG. 6A can be disposed in the pixel region of FIG. 10A. Furthermore, for the purpose of clarity, some of the elements of the pixel structure 1000 shown in FIG. 10A are omitted, and some of the elements are illustrated in bold solid lines for clearly understanding of the relationships between the elements. Reference is made to FIG. 10A and FIG. 10B. The pixel structure 1000 includes a first electrode layer 1010, a second electrode layer 1020, a third electrode layer 1030, a switching element 1040a, a switching element 1040b, a data line 1050, a first scan line 1060a, a second scan line 1060b, and a bridging electrode 1070. In the present embodiment, the data line 1050 extends in the first direction D1, and the first scan line 1060a and the second scan line 1060b extend in the second direction D2.

In the present embodiment, the first electrode layer 1010 is a doped semiconductor layer. The first electrode layer 1010 is electrically connected to the second scan line 1060b through the bridging electrode 1070, and the second scan line 1060b is electrically connected to the common voltage source. In other words, the first electrode layer 1010 is electrically connected to the common voltage source through the bridging electrode 1070 and the second scan line 1060b to serve as a common electrode of the pixel structure 1000. Additionally, the third electrode layer 1030 is electrically connected to the data line 1050 and the first scan line 1060a through the switching element 1040a. By applying a voltage to the switching element 1040a simultaneously through the first scan line 1060a and the data line 1050, a potential of the third electrode layer 1030 is changed, such that the third electrode layer 1030 can serve as a pixel electrode of the pixel structure 1000. Furthermore, the second electrode layer 1020 is electrically connected to the data line 1050 and the first scan line 1060a through the switching element 1040b. The switching element 1040b can serve as a potential control structure of the second electrode layer 1020 to control a potential of the second electrode layer 1020 to be equal to a potential of the first electrode layer 1010 or a potential of the third electrode layer 1030.

In the present embodiment, the switching element 1040a is a thin film transistor which includes a gate 1041a, a source 1042a, a drain 1043a, and a channel layer 1044a. The channel layer 1044a further includes a channel region 1044ac, a source doped region 1044as, and a drain doped region 1044ad. Furthermore, the source doped region 1044as may further include a source heavily-doped region 1044as' and a source lightly-doped region 1044as", and the drain doped region 1044ad may further include a drain heavily-doped region 1044ad' and a drain lightly-doped region 1044ad". In detail, the gate 1041a of the switching element 1040a is electrically connected to the first scan line 1060a, the source 1042a of the switching element 1040a is electrically connected to the data line 1050, and the drain 1043a of the switching element 1040a is electrically connected to the third electrode layer 1030. Additionally, the switching element 1040b can be substantially identical to the switching element 1040a, that is, the switching element 1040b is also a thin film transistor. In detail, the gate 1041b of the switching element 1040b is electrically connected to the first scan line 1060a, the source 1042b of the switching element 1040b is electrically connected to the data line 1050, and the drain 1043b of the switching element 1040b is electrically connected to the second electrode layer 1020.

As shown in FIG. 10B, the pixel structure 1000 further includes a gate dielectric layer GI, a dielectric layer ID, a passivation layer PL, and an insulating layer BP. The gate dielectric layer GI is disposed between the channel layer 1044a and the first scan line 1060a (the gate 1041a), between the channel layer 1044b and the first scan line 1060a (the gate 1041b), and between the first electrode layer 1010 and second scan line 1060b. The dielectric layer ID covers the first scan line 1060a and the second scan line 1060b. The data line 1050 is over the dielectric layer ID. The sources 1042a, 1042b, the drains 1043a, 1043b, and the bridging electrode 1070 extend through the dielectric layer ID. The passivation layer PL covers the data line 1050, the sources 1042a, 1042b, the drains 1043a, 1043b, and the bridging electrode 1070. The second electrode layer 1020 is disposed over the passivation layer PL, and the third electrode layer 1030 is disposed over the second electrode layer 1020 and separated from the second electrode layer 1020. Furthermore, the insulating layer BP may be disposed between the second electrode layer 1020 and the third electrode layer 1030 to electrically isolate the second electrode layer 1020 from the third electrode layer 1030.

The connection relationships, the materials, and the advantages of the elements described above will not be repeated. In the following description, a manufacturing method of the pixel structure 1000 will be described. It is noted that some of the elements are omitted in some of the top views for the purpose of clarity.

Figure 11A:
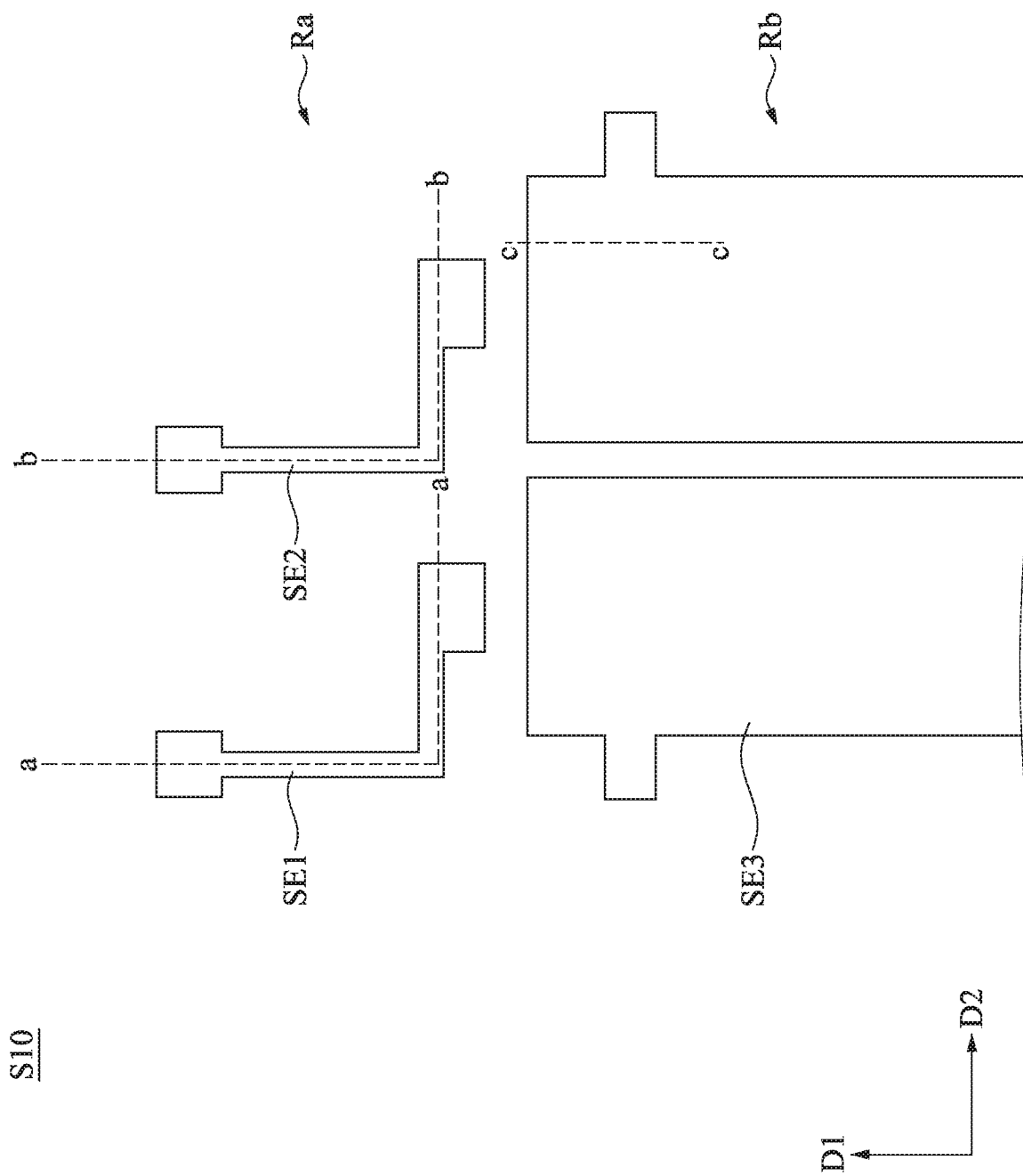

FIG. 11A is a top view of step S10 of the manufacturing method of the pixel structure 1000 according to an embodiment of the present disclosure. FIG. 11B is a combined cross-sectional view of the pixel structure 1000 shown in FIG. 11A along line a-a, line b-b, and line c-c. Reference is made to FIG. 11A and FIG. 11B. In step S10, semiconductor pattern layers SE (including semiconductor pattern layers SE1, SE2, SE3) are disposed over the substrate (not shown in the drawings). In the present embodiment, the semiconductor pattern layers SE may be formed by deposition and lithography patterning, and the semiconductor pattern layers SE may be made of polysilicon or other suitable materials, but the present disclosure is not limited in this regard. Furthermore, a light shielding layer (not shown in the drawings) may be selectively disposed below the semiconductor pattern layers SE to prevent light leakage of the pixel structure 1000. Additionally, the semiconductor pattern layers SE1, SE2 are in a thin film transistor region Ra of the pixel structure 1000, and the semiconductor pattern layer SE3 is in an aperture region Rb of the pixel structure 1000.

Figure 12A:
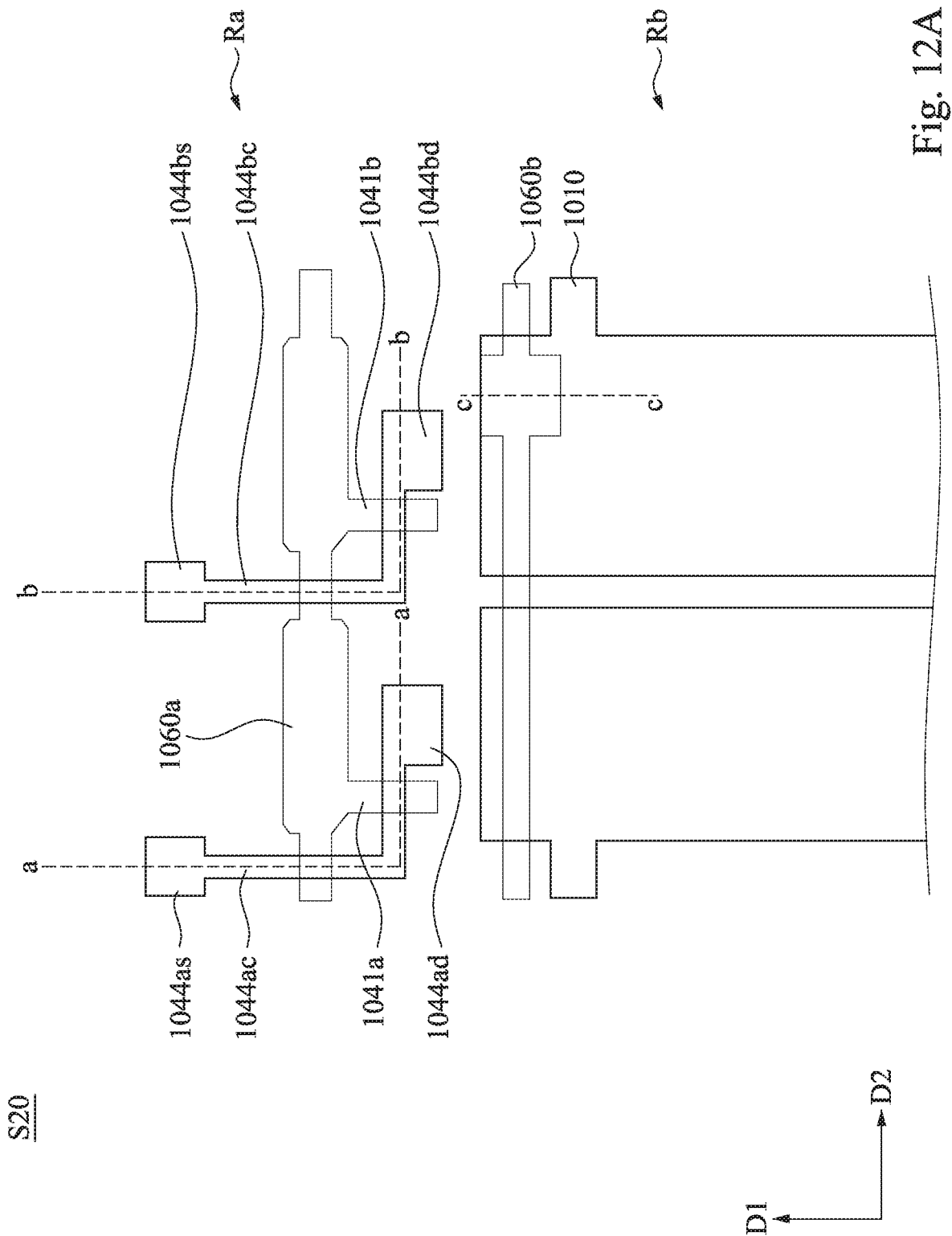
Figure 12B:
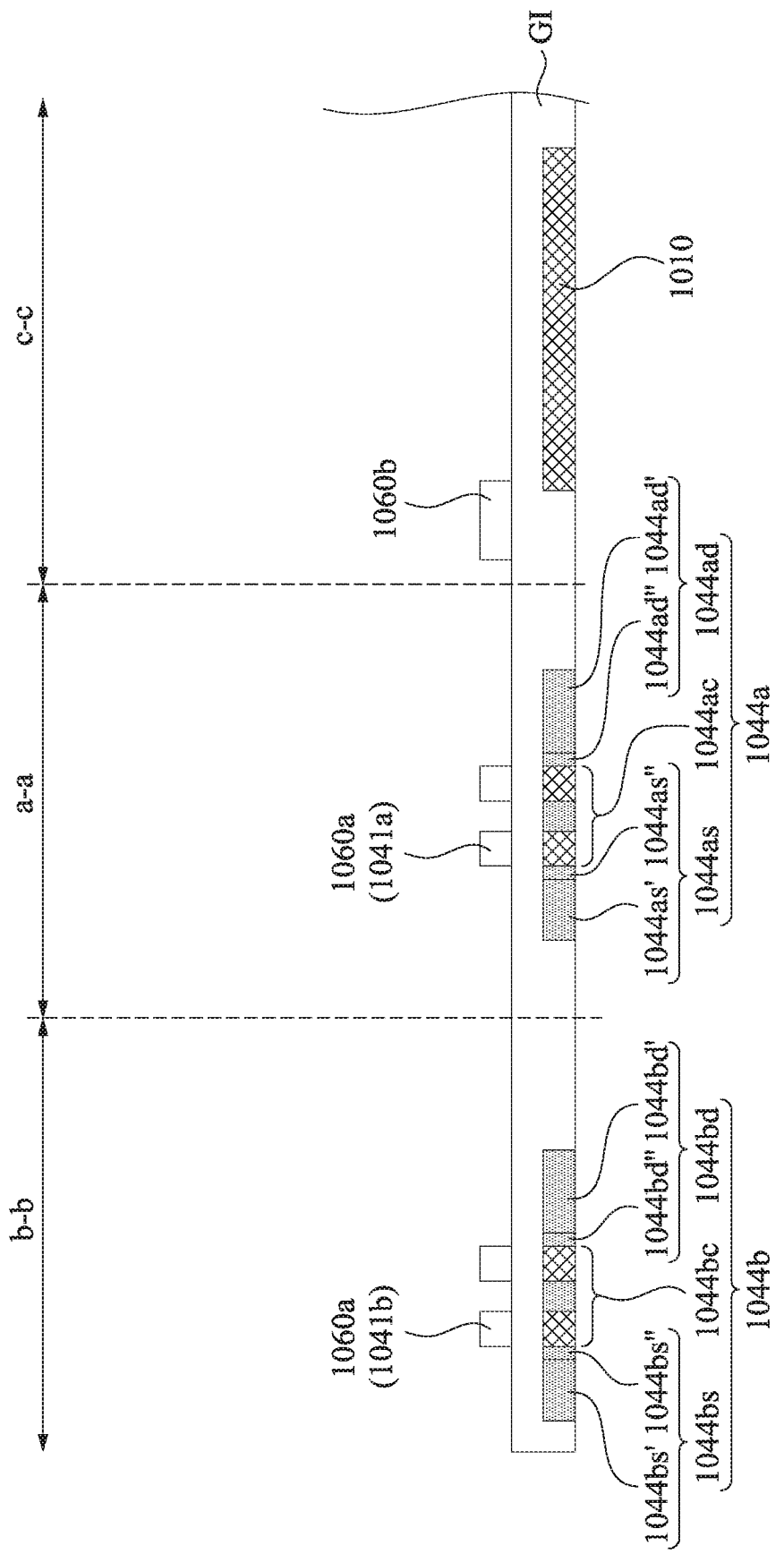

FIG. 12A is a top view of step S20 of the manufacturing method of the pixel structure 1000 according to an embodiment of the present disclosure. FIG. 12B is a combined cross-sectional view of the pixel structure 1000 shown in FIG. 12A along line a-a, line b-b, and line c-c. Reference is made to FIG. 12A and FIG. 12B. In step S20, the gate dielectric layer GI is disposed over the substrate (not shown in the drawings) to cover the semiconductor pattern layers SE, and the first scan line 1060a (the gate 1041a, 1041b) and the second scan line 1060b are respectively disposed over the semiconductor pattern layers SE1, SE2 and the semiconductor pattern layer SE3 shown in FIG. 11B. However, the present disclosure is not limited in this regard. The first scan line 1060a (the gate 1041a, 1041b) can be disposed below the semiconductor pattern layers SE1, SE2. If the first scan line 1060a (the gates 1041a, 1041b) is disposed over the semiconductor pattern layers SE1, SE2, a top-gate thin film transistor will be formed in the subsequent steps; If the first scan line 1060a (the gates 1041a, 1041b) is disposed below the semiconductor pattern layers SE1, SE2, a bottom-gate thin film transistor will be formed in the subsequent steps. In the present embodiment, the first scan line 1060a and the second scan line 1060b may be formed by sputtering and lithography patterning. A doping process is then performed on the semiconductor pattern layers SE, such that regions of the semiconductor pattern layers SE not being covered by the first scan line 1060a and the second scan line 1060b are formed to be doped semiconductor layers. In detail, the doped semiconductor layers at two ends of the semiconductor pattern layer SE1 are the source doped region 1044as and the drain doped region 1044ad; the doped semiconductor layers at two ends of the semiconductor pattern layer SE2 are the source doped region 1044bs and the drain doped region 1044bd; the doped semiconductor layer of the semiconductor pattern layer SE3 is the first electrode layer 1010. Furthermore, regions covered by the first scan line 1060a (i.e., undoped regions) and the middle doped semiconductor layer of the semiconductor pattern layer SE1 is the channel region 1044ac; regions covered by the first scan line 1060a (i.e., undoped regions) and the middle doped semiconductor layer of the semiconductor pattern layer SE2 is the channel region 1044bc. In the present embodiment, the doping process may include a heavily doped process and/or a lightly doped process, as deemed necessary by designers. After performing step S20, the channel layer 1044a including the source doped region 1044as, the drain doped region 1044ad, and the channel region 1044ac, and the channel layer 1044b including the source doped region 1044bs, the drain doped region 1044bd, and the channel region 1044bc are formed.

In the present embodiment, a transmittance of the doped semiconductor layers to visible light is in a range from 50% to 100%, such that the light transmittance of the first electrode layer 1010 in the aperture region Rb is good. Furthermore, since the channel layers 1044a, 1044b and the first electrode layer 1010 are simultaneously formed in the same step, the manufacturing steps and the throughput of manufacturing process can be reduced, and the simplification of the mask can be achieved.

Figure 13A:
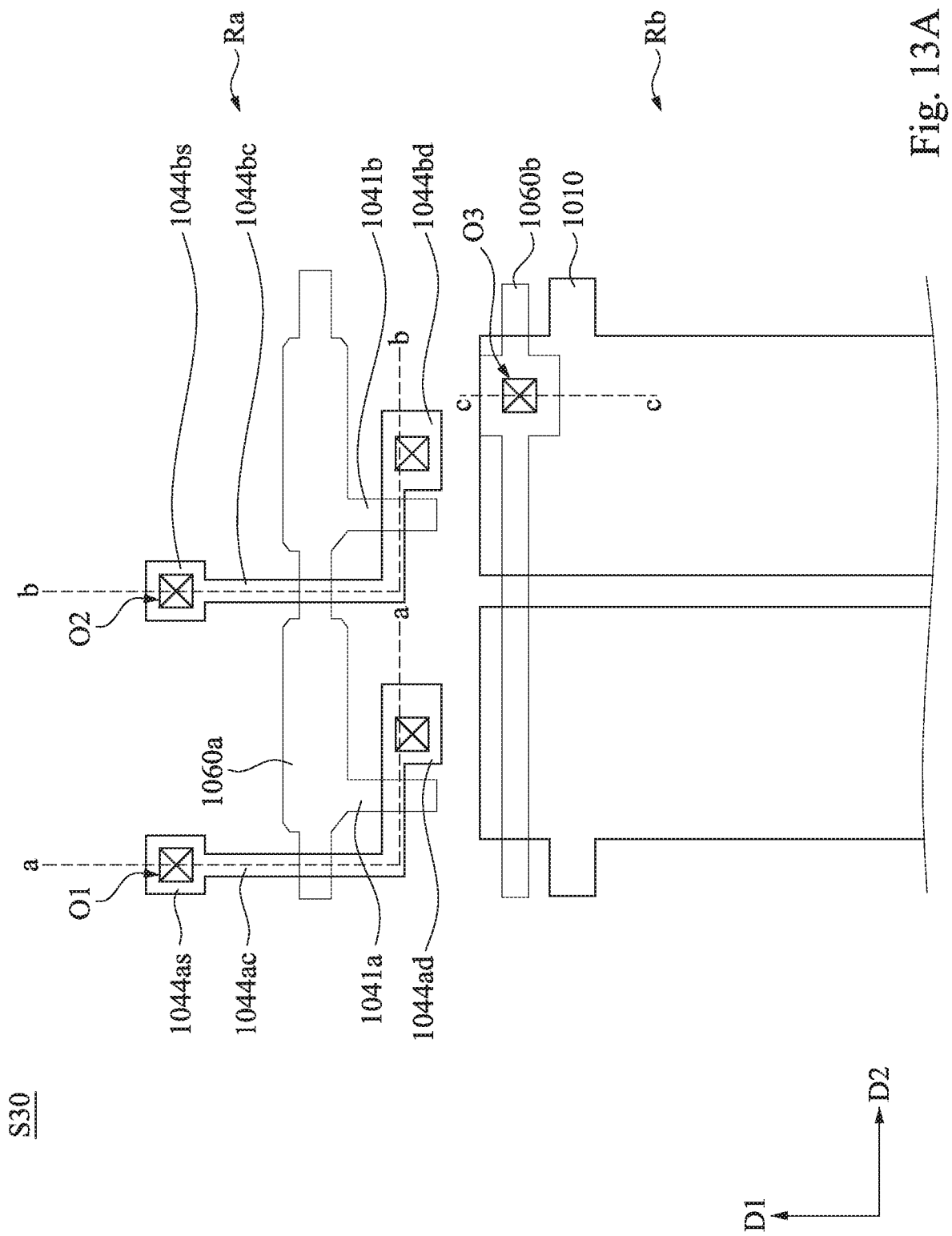
Figure 13B:
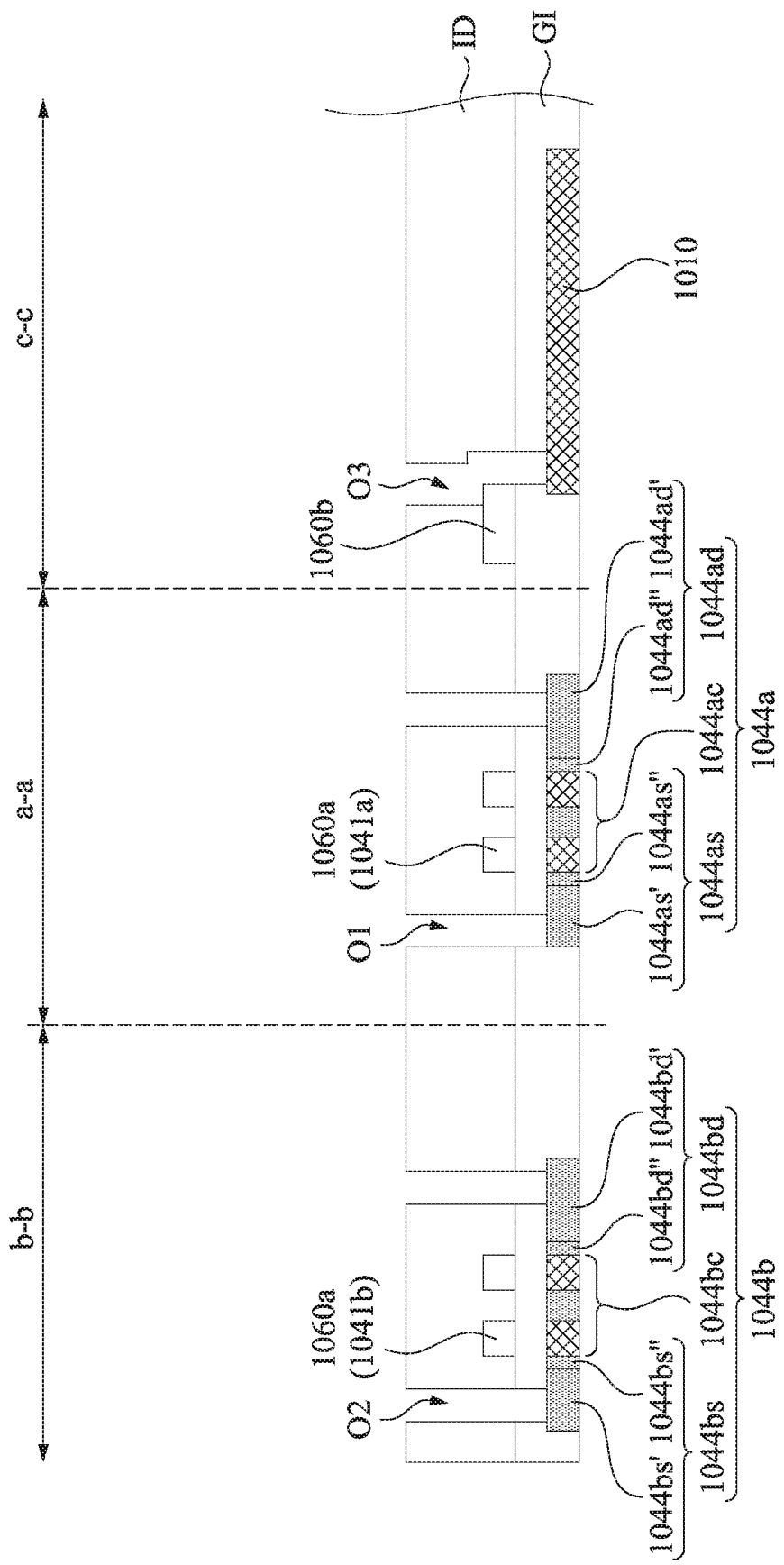

FIG. 13A is a top view of step S30 of the manufacturing method of the pixel structure 1000 according to an embodiment of the present disclosure. FIG. 13B is a combined cross-sectional view of the pixel structure 1000 shown in FIG. 13A along line a-a, line b-b, and line c-c. Reference is made to FIG. 13A and FIG. 13B. In step S30, the dielectric layer ID is disposed over the gate dielectric layer GI to cover the first scan line 1060a and the second scan line 1060b. Through holes O1, O2, O3 are formed in the gate dielectric layer GI and the dielectric layer ID, such that the source doped region 1044as and the drain doped region 1044ad are exposed from the through hole O1, the source doped region 1044bs and the drain doped region 1044bd are exposed from the through hole O2, and a portion of the first electrode layer 1010 and a portion of the second scan line 1060b is exposed from the through hole O3. In the present embodiment, the dielectric layer ID and the through holes O1, O2, O3 may be formed by deposition and lithography patterning, but the present disclosure is not limited in this regard.

Figure 14A:
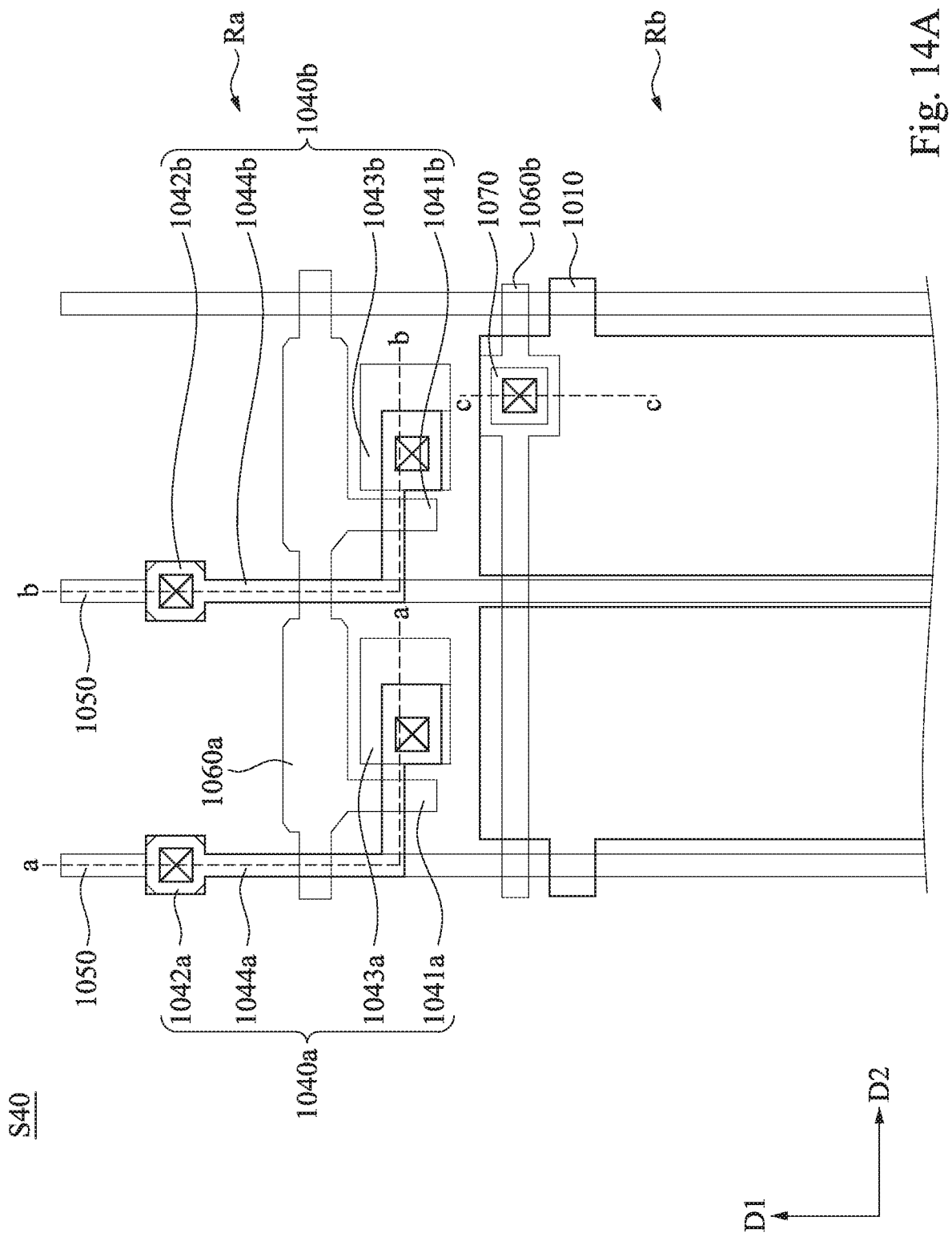
Figure 14B:
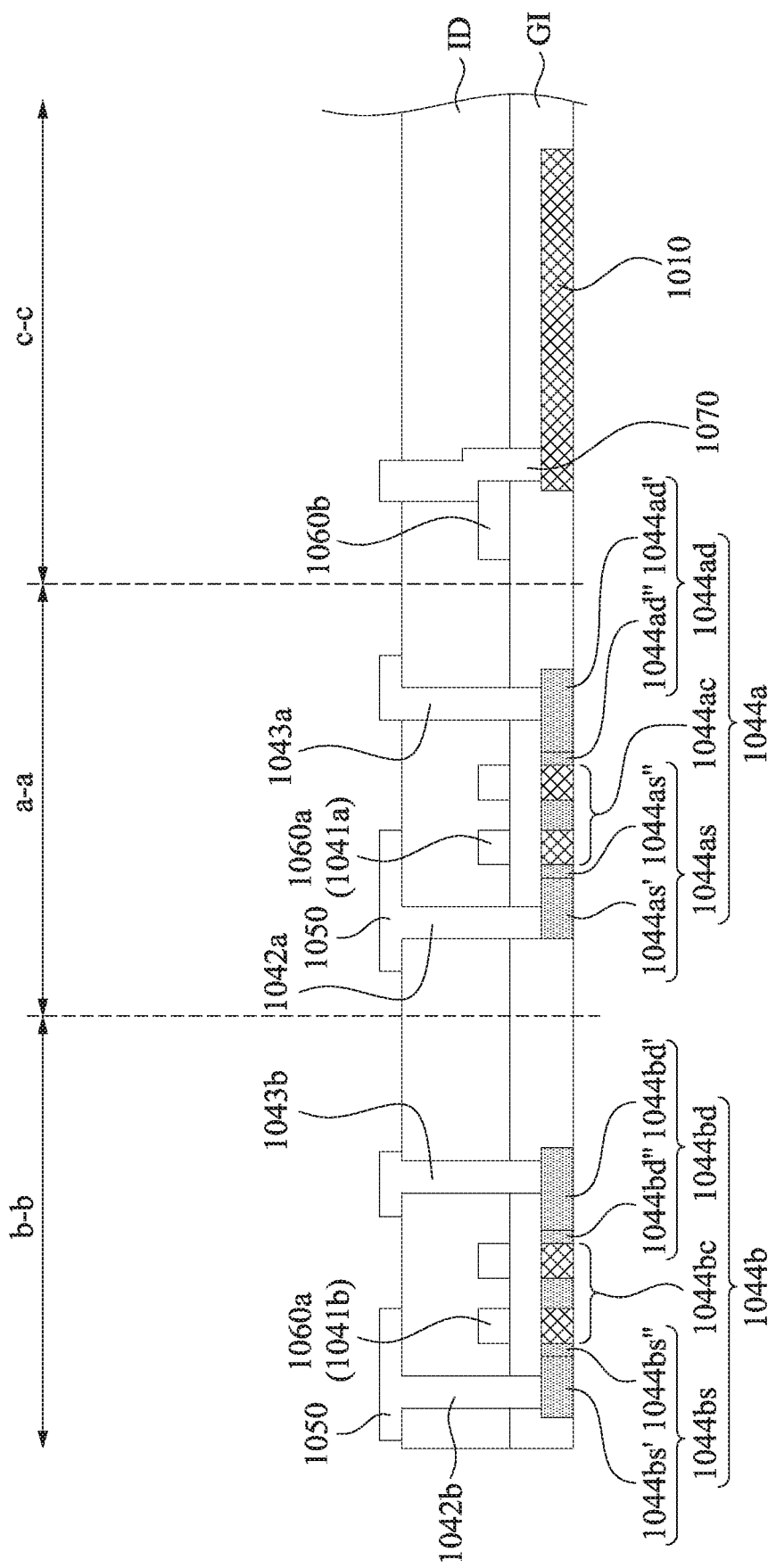

FIG. 14A is a top view of step S40 of the manufacturing method of the pixel structure 1000 according to an embodiment of the present disclosure. FIG. 14B is a combined cross-sectional view of the pixel structure 1000 shown in FIG. 14A along line a-a, line b-b, and line c-c. Reference is made to FIG. 14A and FIG. 14B. In step S40, forming a metal material in the through holes O1, O2, O3 and on the dielectric layer ID by sputtering, and forming the data line 1050 extending in the first direction D1, the source 1042a and the drain 1043a in the through hole O1, and the source 1042b and the drain 1043b in the through hole O2, and the bridging electrode 1070 in the through hole O3. The source doped regions 1044as, 1044bs are respectively connected to the data line 1050 through the sources 1042a, 1042b. The first electrode layer 1010 is connected to the second scan line 1060b through the bridging electrode 1070 for further electrical connections to the common voltage source. After performing step S40, the switching element 1040a including the gate 1041a, the source 1042a, the drain 1043a, and the channel layer 1044a, and the switching element 1040b including the gate 1041b, the source 1042b, the drain 1043b, and the channel layer 1044b are formed.

Figure 15A:
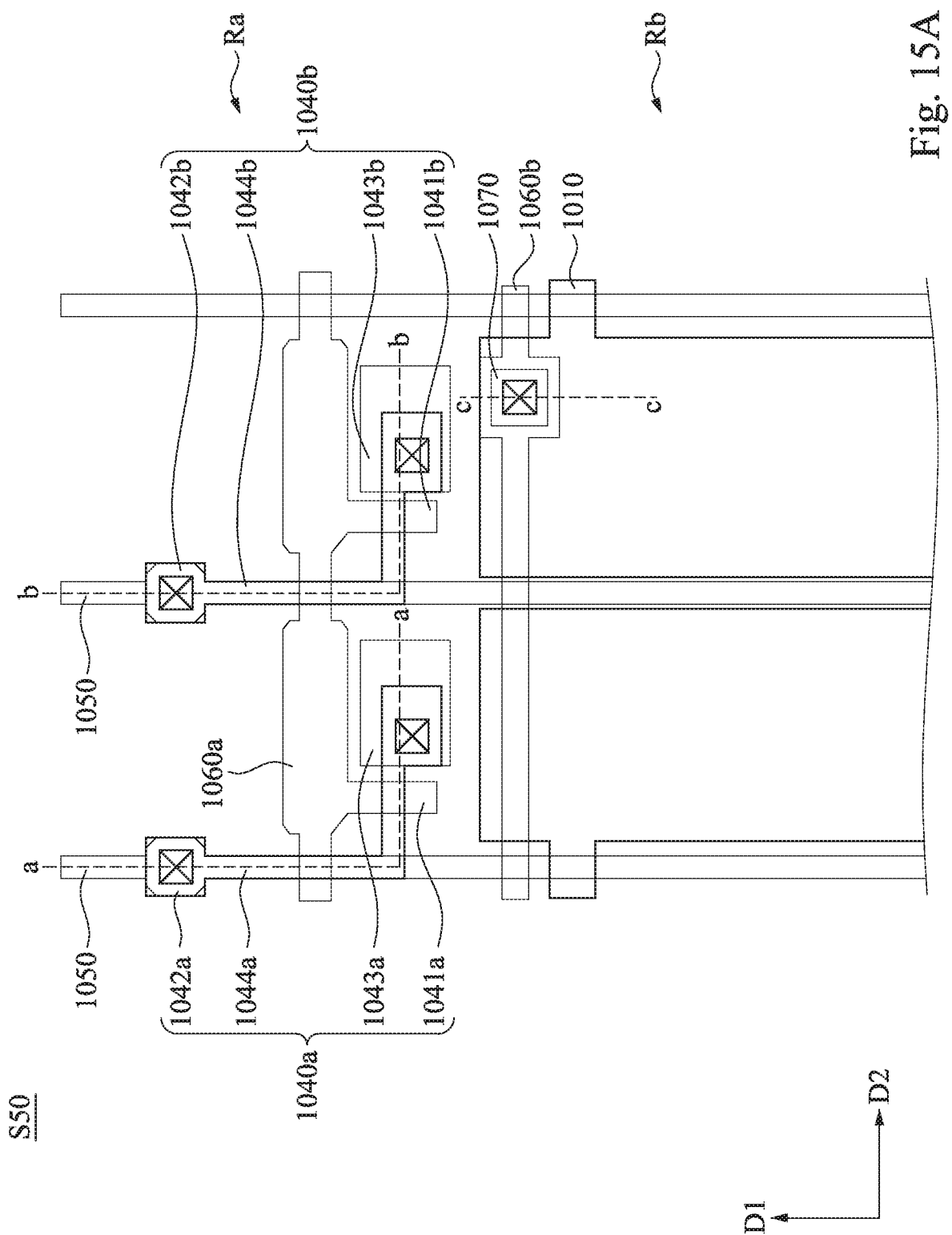
Figure 15B:
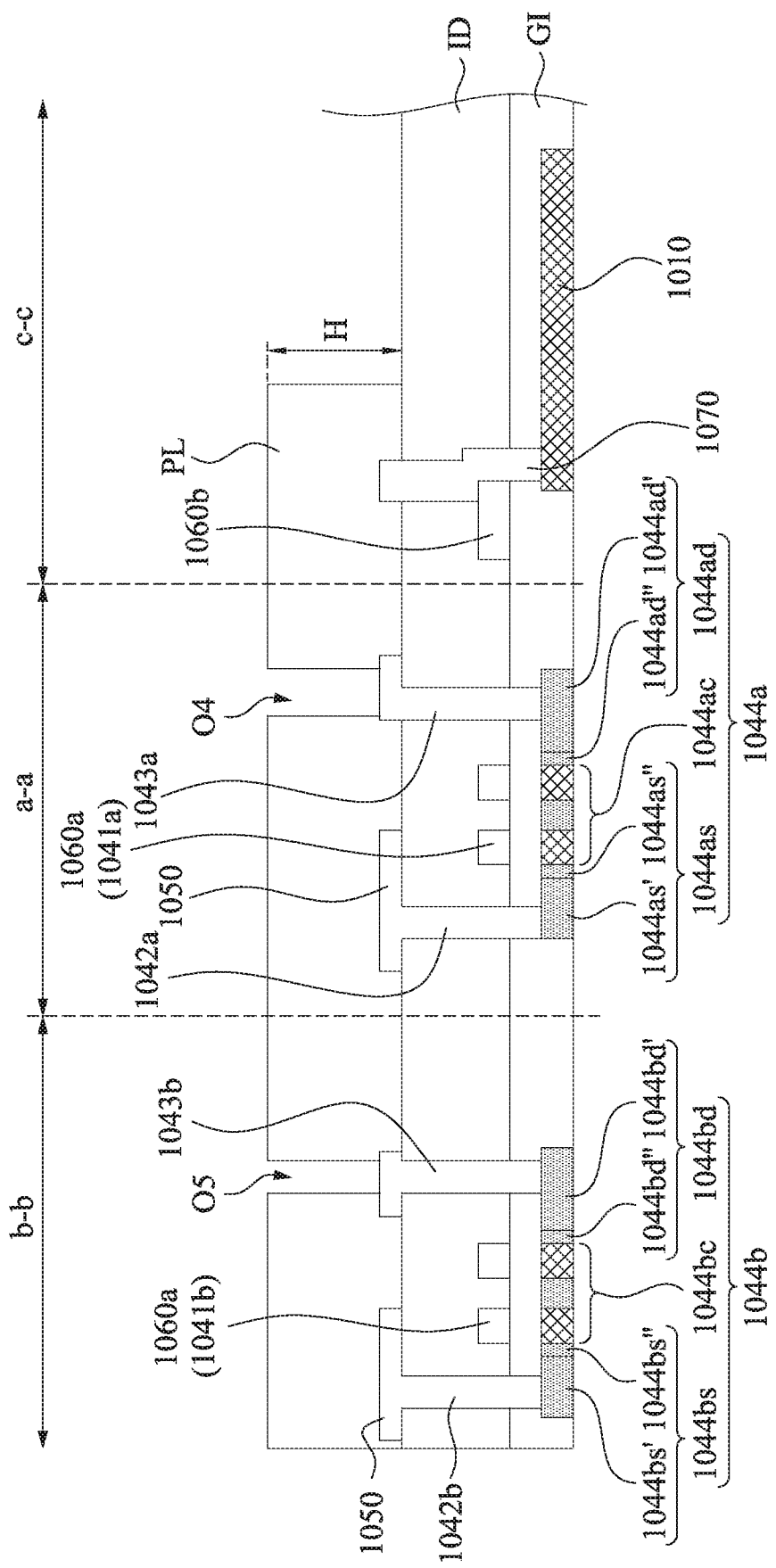

FIG. 15A is a top view of step S50 of the manufacturing method of the pixel structure 1000 according to an embodiment of the present disclosure. FIG. 15B is a combined cross-sectional view of the pixel structure 1000 shown in FIG. 15A along line a-a, line b-b, and line c-c. Reference is made to FIG. 15A and FIG. 15B. In step S50, the passivation layer PL is disposed on the dielectric layer ID in the thin film transistor region Ra and a portion of the aperture region Ra. Through holes O4, O5 are formed in the passivation layer PL, such that the drain 1043a of the switching element 1040a is exposed from the through hole O4, and the drain 1043b of the switching element 1040b is exposed from the through hole O5. In the present embodiment, the passivation layer PL and the through holes O4, O5 may be formed by coating and lithography patterning, but the present disclosure is not limited in this regard. Further, a thickness H of the passivation layer PL is in a range from 1 micrometer to 3 micrometer to reduce a capacitance of the pixel structure 1000.

Figure 16A:
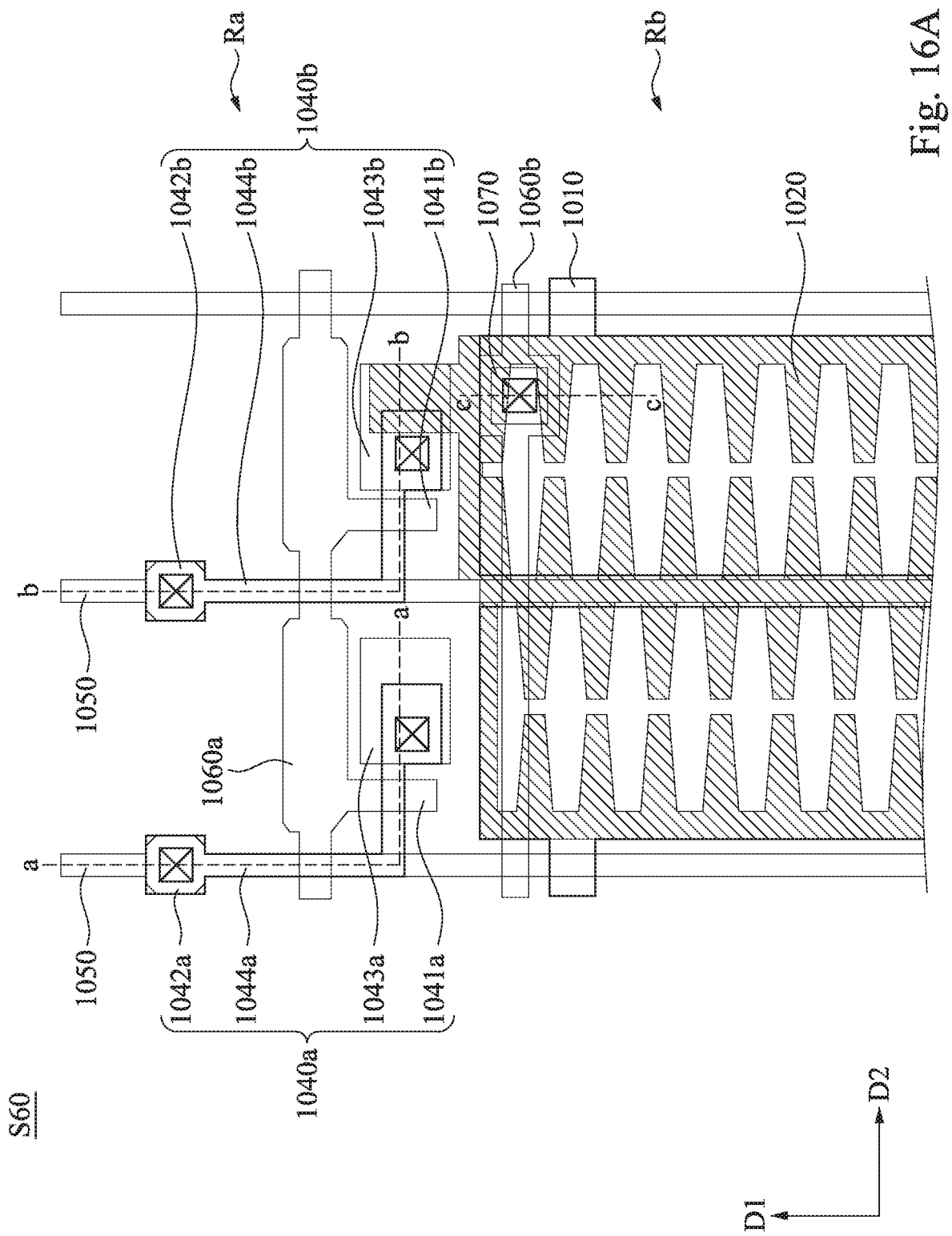
Figure 16B:
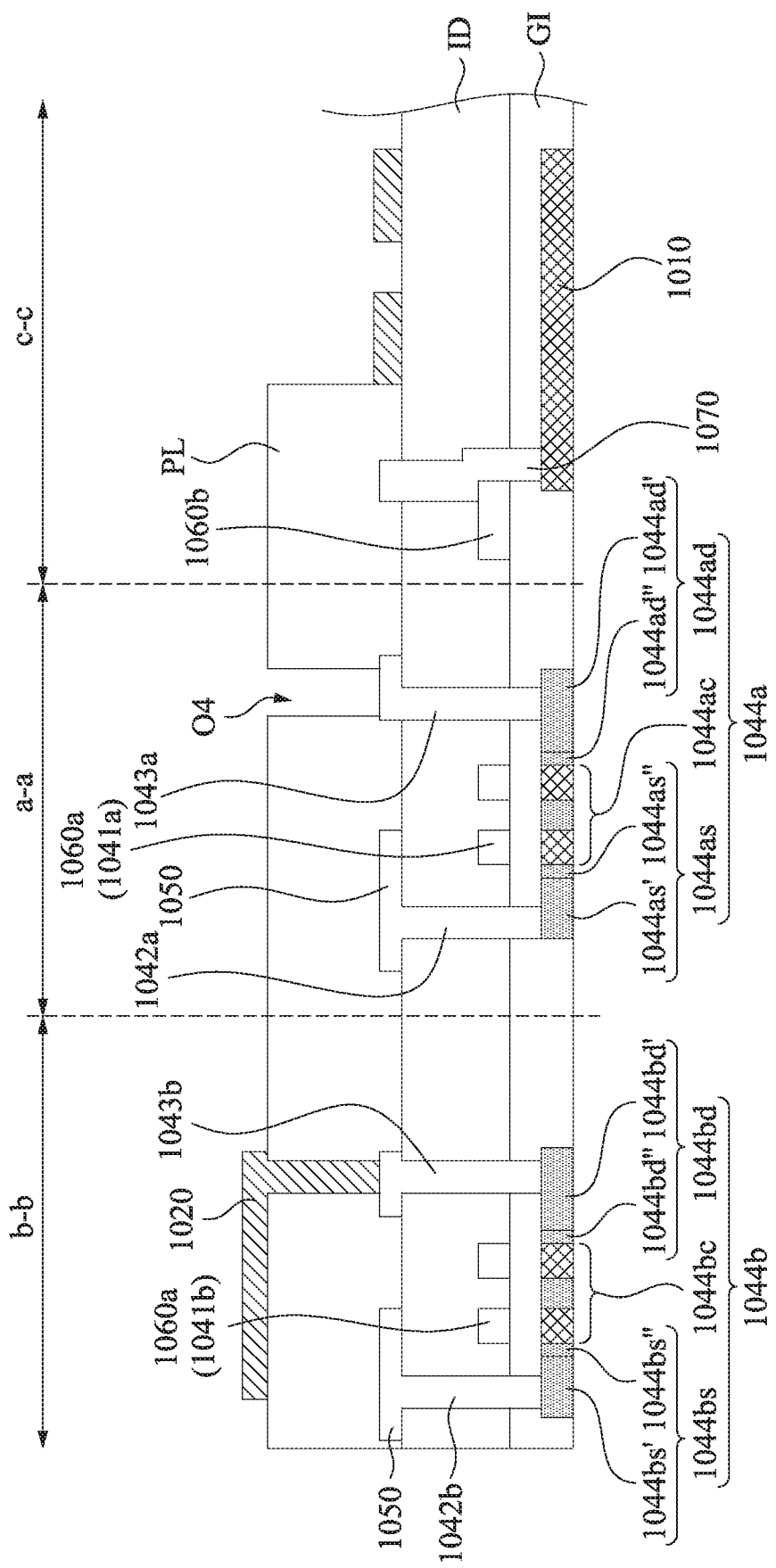

FIG. 16A is a top view of step S60 of the manufacturing method of the pixel structure 1000 according to an embodiment of the present disclosure. FIG. 16B is a combined cross-sectional view of the pixel structure 1000 shown in FIG. 16A along line a-a, line b-b, and line c-c. Reference is made to FIG. 16A and FIG. 16B. In step S60, the second electrode layer 1020 is formed in the through hole O5, on the passivation layer PL in the thin film transistor region Ra, and on the dielectric layer ID in the aperture region Rb, such that the second electrode layer 1020 is connected to the drain 1043b of the switching element 1040b, and electrically connected to the data line 1050 through the switching element 1040b. In the present embodiment, the second electrode layer 1020 may be formed by sputtering and lithography pattering. The second electrode layer 1020 may be a transparent conductive layer such as a transparent conductive oxide (TCO). For example, the transparent conductive oxide may be a metal oxide (e.g., indium tin oxide, indium zinc oxide, aluminum tin oxide, aluminum zinc oxide, indium zinc germanium oxide, other suitable oxides, or a stacking of at least two of the above mentioned oxides), but the present disclosure is not limited in this regard.

Figure 17A:
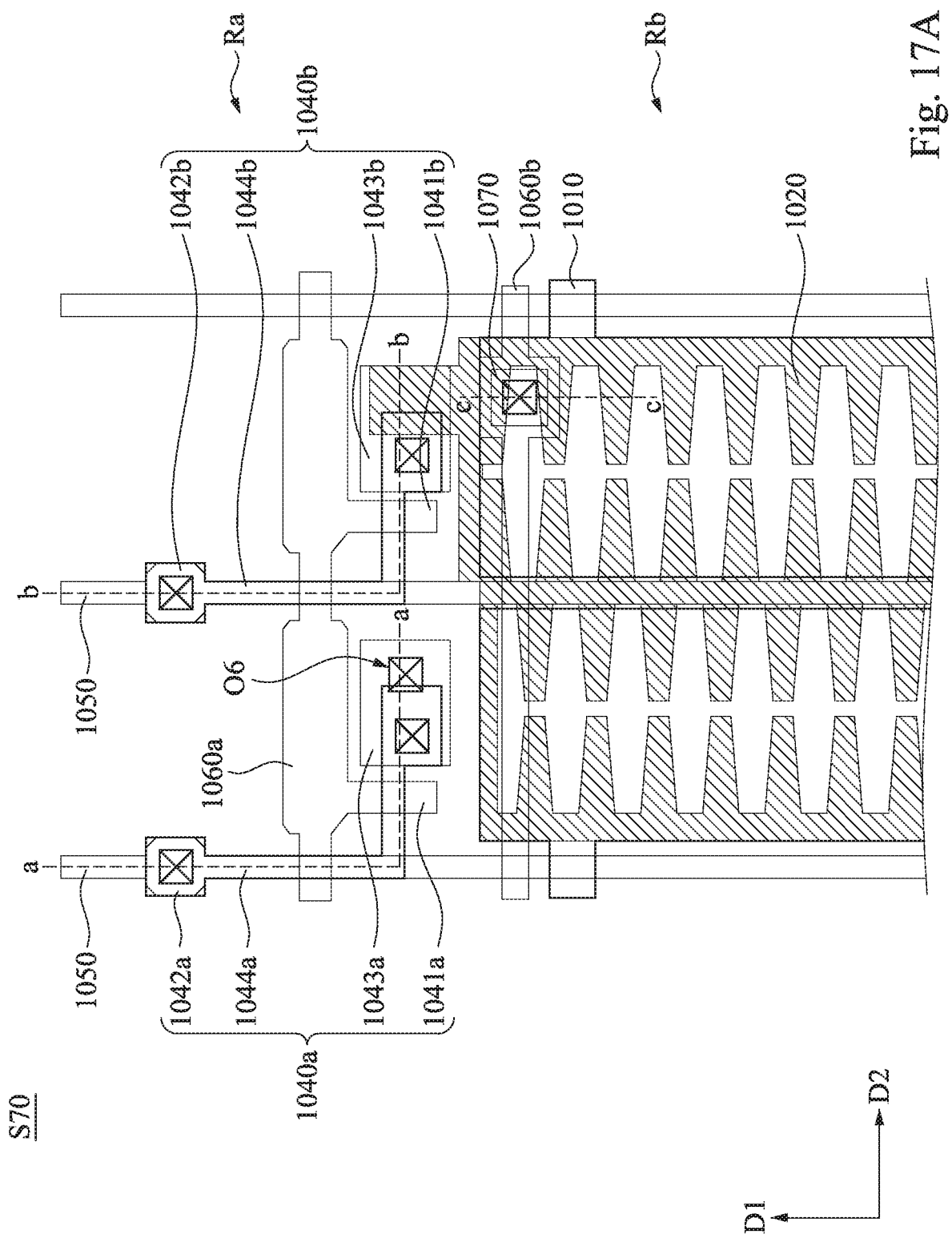
Figure 17B:
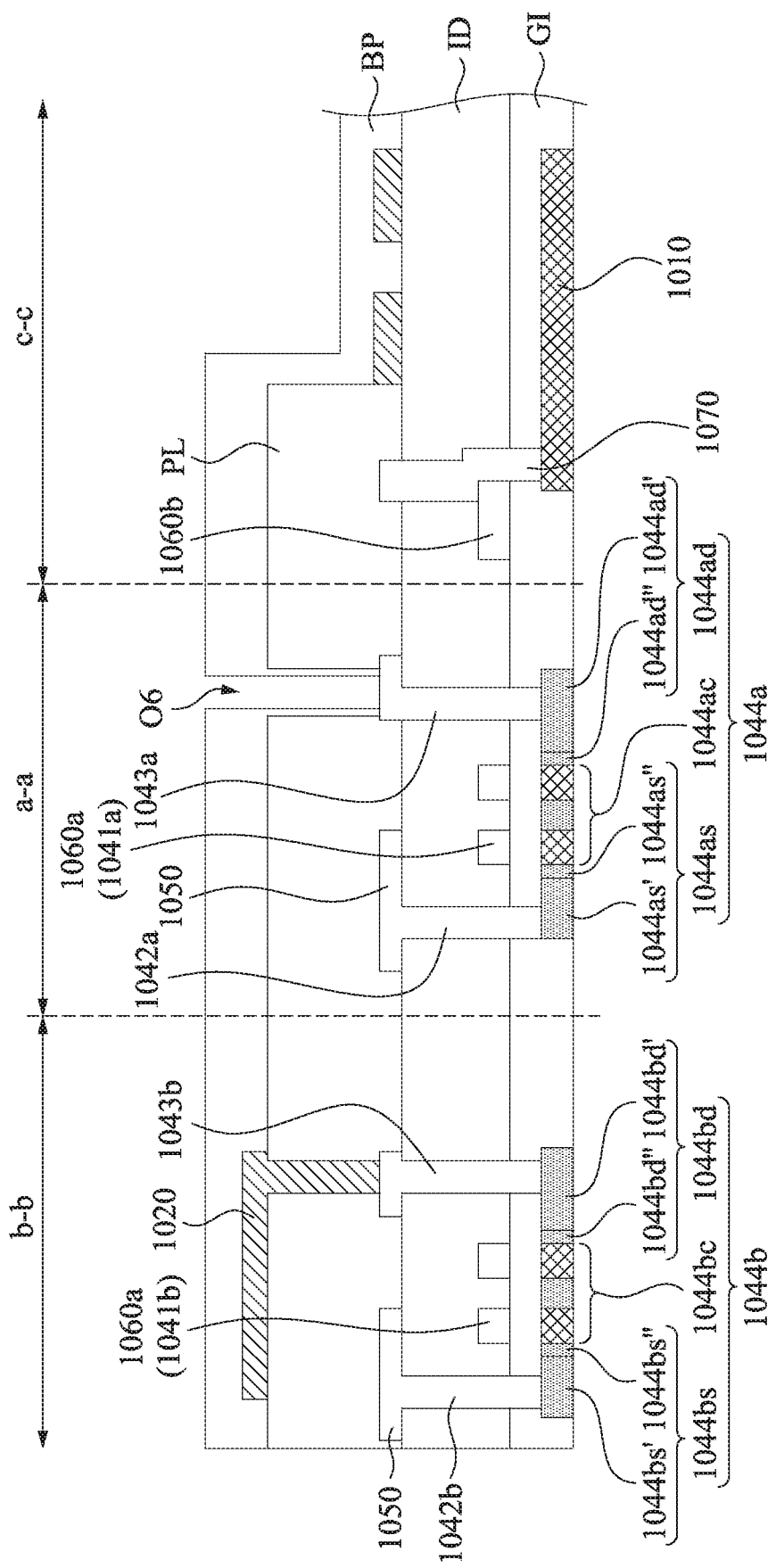

FIG. 17A is a top view of step S70 of the manufacturing method of the pixel structure 1000 according to an embodiment of the present disclosure. FIG. 17B is a combined cross-sectional view of the pixel structure 1000 shown in FIG. 17A along line a-a, line b-b, and line c-c. Reference is made to FIG. 17A and FIG. 17B. In step S70, the insulating layer BP is disposed on the passivation layer PL and the dielectric layer ID in the aperture region Ra to cover the second electrode layer 1020. A through hole O6 is formed in the insulating layer BP, such that the drain 1043a of the switching element 1040a is exposed from the through hole O6. In the present embodiment, a deposition process may be performed to form the insulating layer BP on the passivation layer PL and the dielectric layer ID in the aperture region Ra, and in the through hole O4. A portion of the insulating layer BP in the through hole O4 is then removed by lithography patterning to form the through hole O6.

Figure 18A:
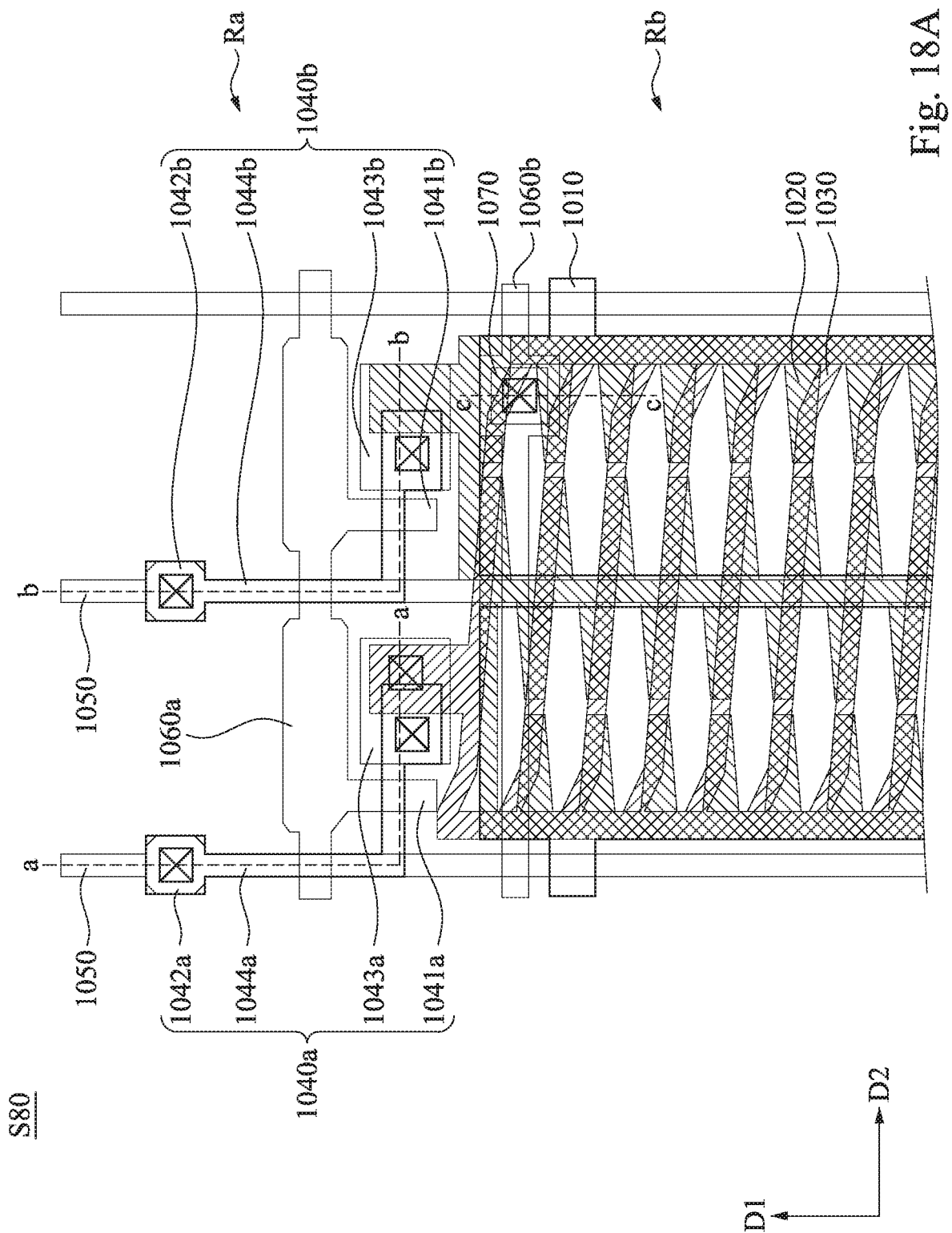
Figure 18B:
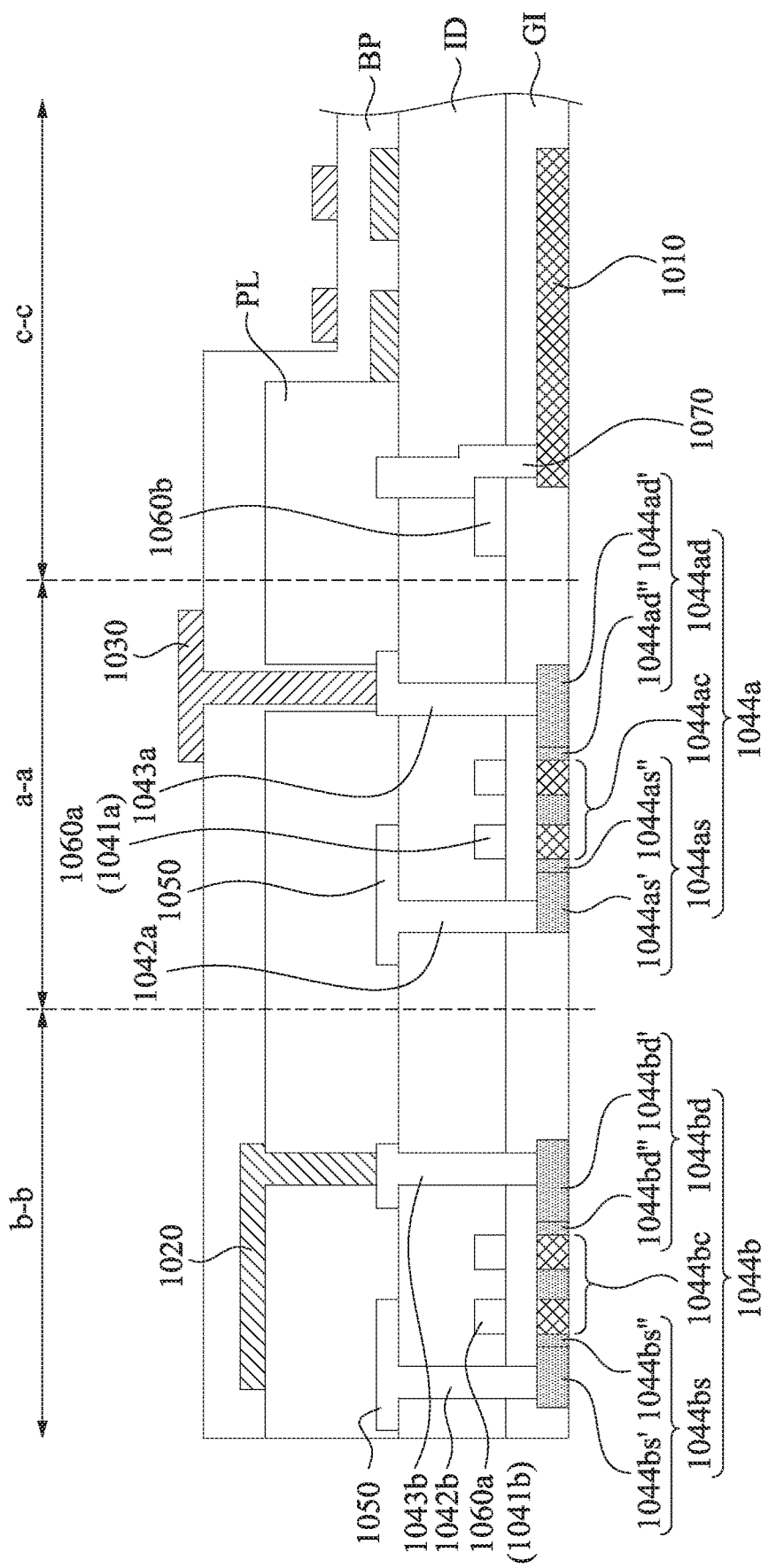

FIG. 18A is a top view of step S80 of the manufacturing method of the pixel structure 1000 according to an embodiment of the present disclosure. FIG. 18B is a combined cross-sectional view of the pixel structure 1000 shown in FIG. 18A along line a-a, line b-b, and line c-c. Reference is made to FIG. 18A and FIG. 18B. In step S80, the third electrode layer 1030 is formed in the through hole O6 and on the insulating layer BP, such that the third electrode layer 1030 is connected to the drain 1043a of the switching element 1040a, and electrically connected to the data line 1050 through the switching element 1040a. In the present embodiment, the third electrode layer 1030 may be formed by sputtering and lithography pattering. The third electrode layer 1030 may be a transparent conductive layer such as a transparent conductive oxide (TCO). For example, the transparent conductive oxide may be a metal oxide (e.g., indium tin oxide, indium zinc oxide, aluminum tin oxide, aluminum zinc oxide, indium zinc germanium oxide, other suitable oxides, or a stacking of at least two of the above mentioned oxides), but the present disclosure is not limited in this regard. After performing step S80, the pixel structure 1100 shown in FIG. 10A and FIG. 10B can be obtained.

Figure 19:
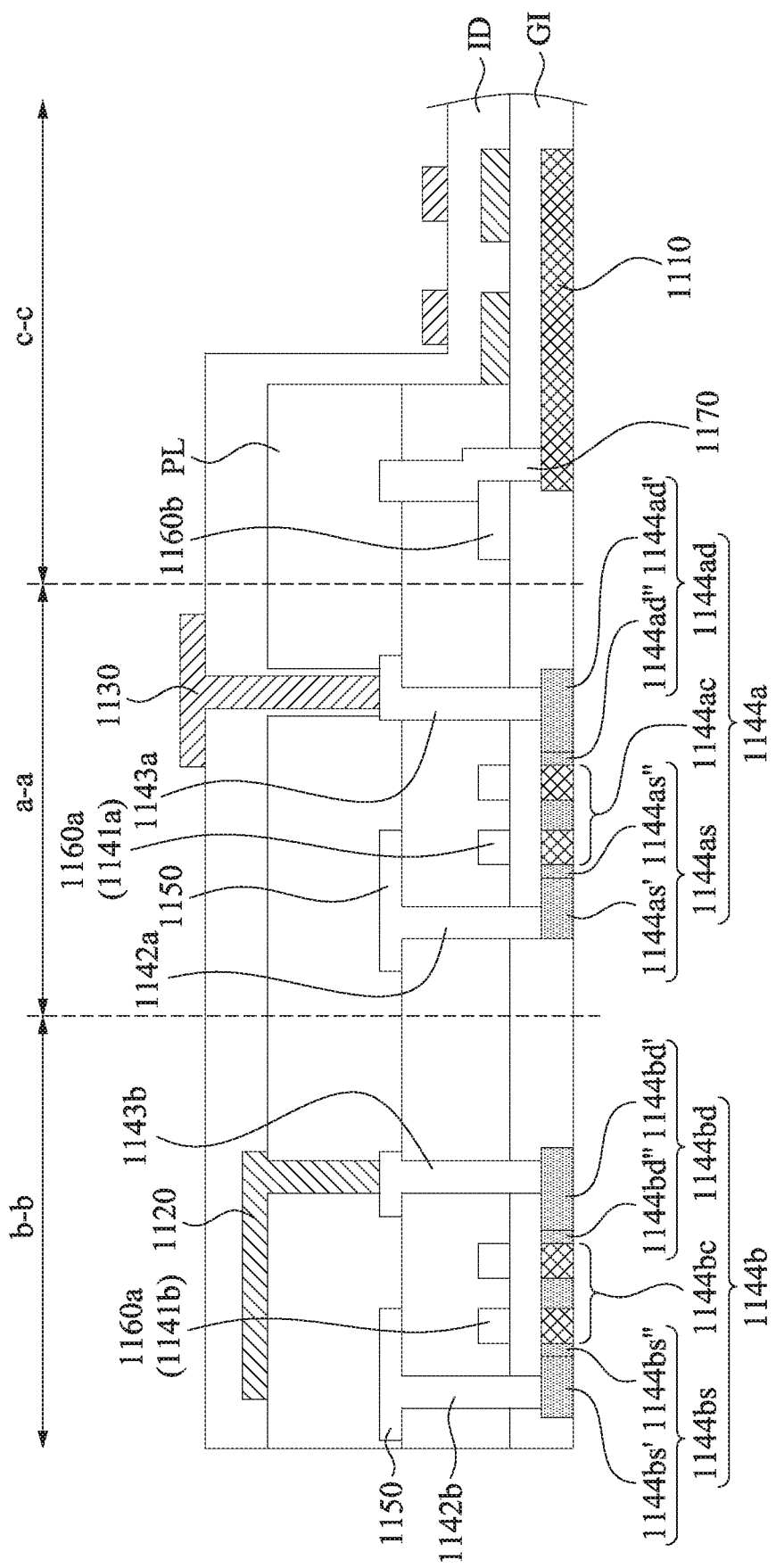
FIG. 19 is a cross-sectional view of a pixel structure according to another embodiment of the present disclosure.

FIG. 19 is a combined cross-sectional view of a pixel structure 1100 according to another embodiment of the present disclosure, in which the cross-sectional position is identical to line a-a, line b-b, and line c-c shown in FIG. 10A. Reference is made to FIG. 10B and FIG. 19. The difference between the pixel structure 1100 shown in FIG. 19 and the pixel structure 1000 shown in FIG. 10B is that no dielectric layer ID is in a portion of the aperture region Rb of the pixel structure 1100. The formation of the pixel structure 1100 can be achieved by performing a lithography patterning process using a half-tone mask in the aforementioned step S30. As such, the dielectric layer ID can be formed only in the thin film transistor region Ra and a portion of the aperture region Rb to reduce an isolation thickness between the second electrode layer 1120 and the first electrode layer 1110 in the aperture region Rb. Therefore, the capacitance and the operating voltage are effectively reduced.

Figure 20A:
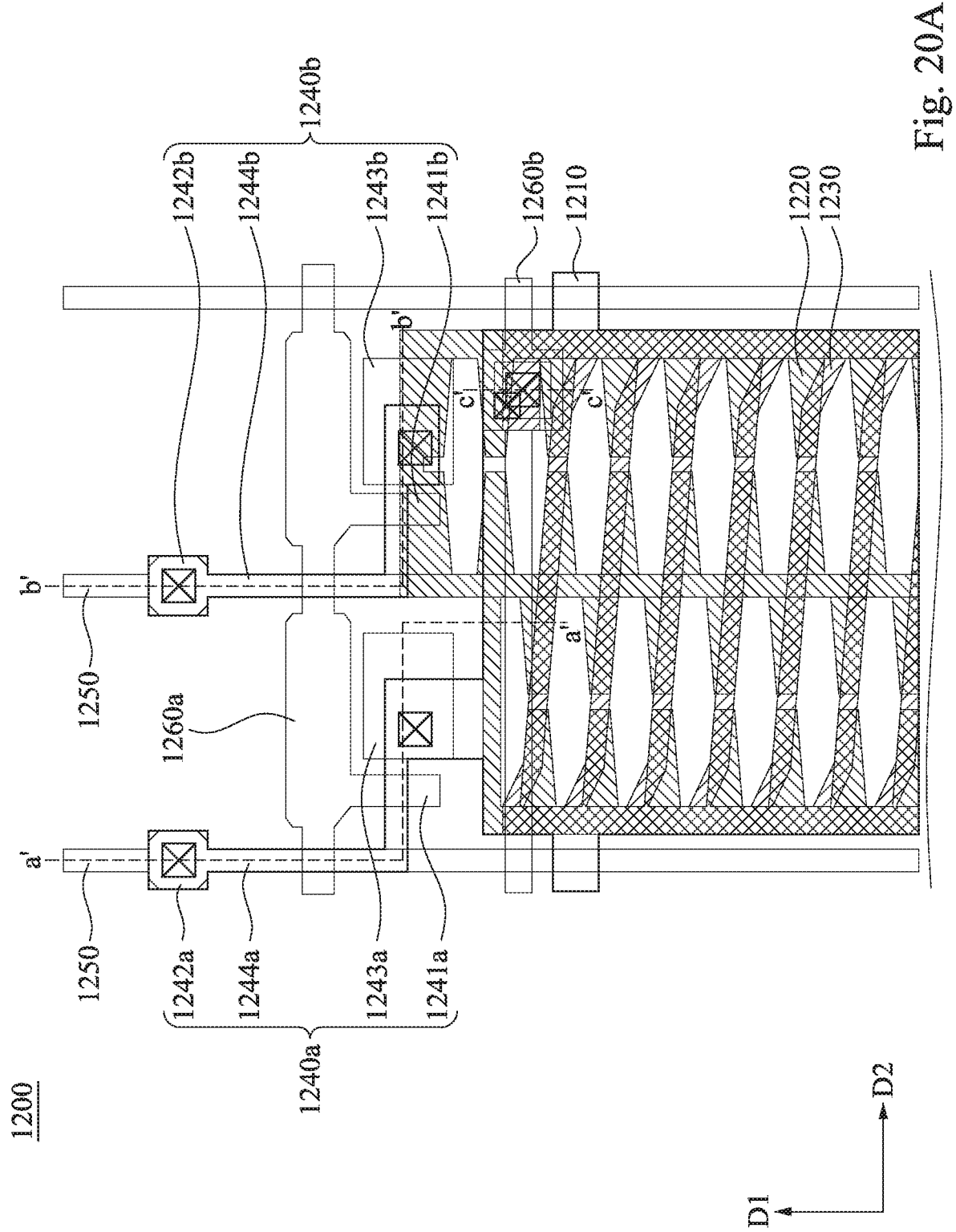
FIG. 20A is a top view of a pixel structure according to another embodiment of the present disclosure.
Figure 20B:
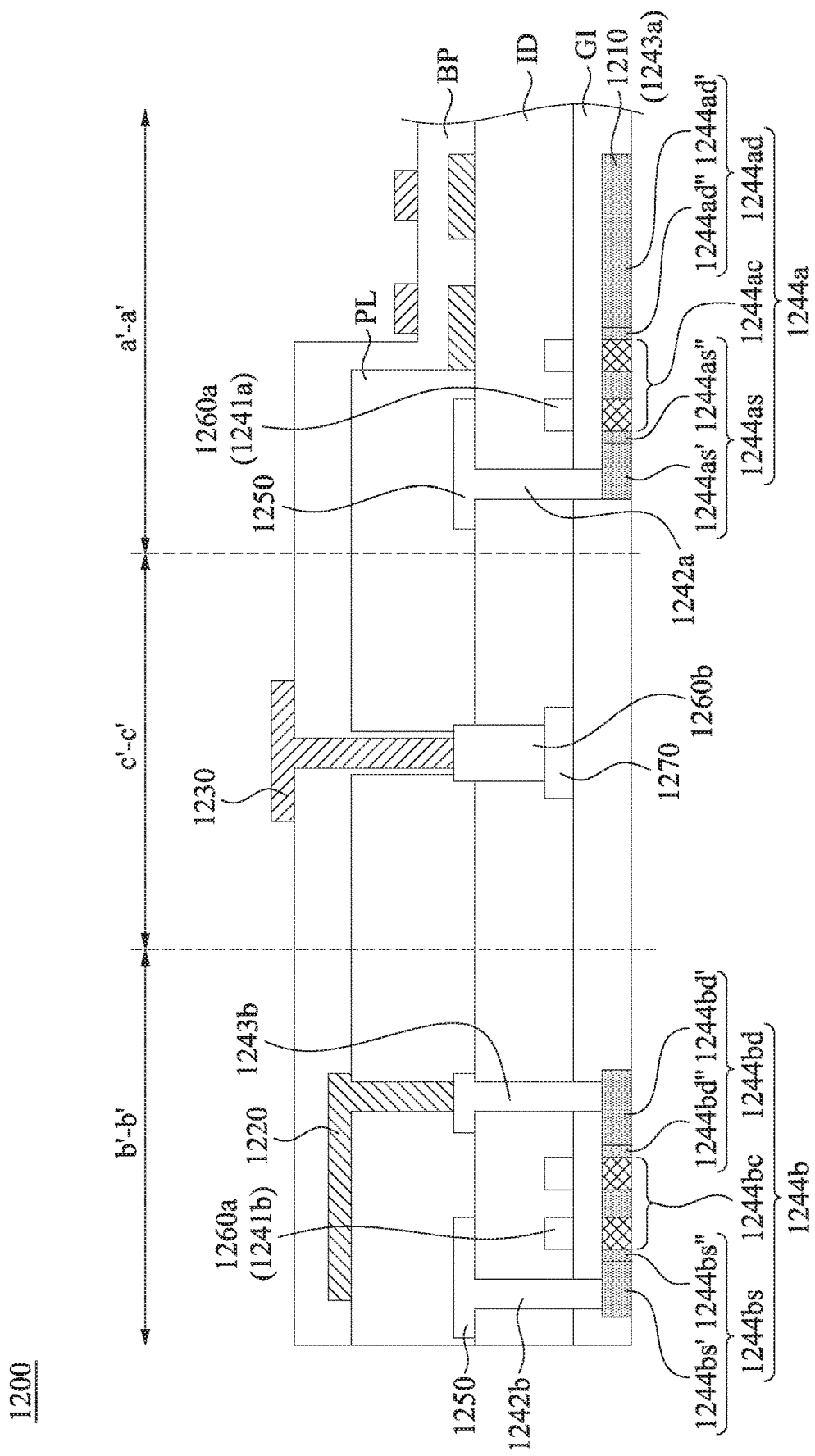
FIG. 20B is a combined cross-sectional view of the pixel structure shown in FIG. 20A along various lines.

FIG. 20A is a top view of a pixel structure 1200 according to another embodiment of the present disclosure. FIG. 20B is a combined cross-sectional view of the pixel structure 1000 shown in FIG. 20A along line a'-a', line b'-b', and line c'-c'. Reference is made to FIG. 20A and FIG. 20B. The pixel structure 1200 includes a first electrode layer 1210, a second electrode layer 1220, a third electrode layer 1230, a switching element 1240a, a switching element 1240b, a data line 1250, a first scan line 1260a, a second scan line 1260b, and a bridging electrode 1270. In the present embodiment, the data line 1250 extends in the first direction D1, and the first scan line 1260a and the second scan line 1260b extend in the second direction D2. It is noted that the elements, the materials of the elements, and the advantages of the pixel structure 1200 shown in FIG. 20A and FIG. 20B is similar to that of the pixel structure 1000 shown in FIG. 10A and FIG. 10B, and hence will not be repeated hereinafter. In the following description, the connection relationships between the elements of the pixel structure 1200 will be described.

In the present embodiment, the third electrode layer 1230 is electrically connected to the second scan line 1260b through the bridging electrode 1270, and the second scan line 1260b is electrically connected to the common voltage source. In other words, the third electrode layer 1230 is electrically connected to the common voltage source through the bridging electrode 1270 and the second scan line 1260b to serve as a common electrode of the pixel structure 1200. Additionally, the first electrode layer 1210 is electrically connected to the data line 1250 and the first scan line 1260a through the switching element 1240a. By applying a voltage to the switching element 1240a simultaneously through the first scan line 1260a and the data line 1250, a potential of the first electrode layer 1210 is changed, such that the first electrode layer 1210 can serve as a pixel electrode of the pixel structure 1200. Furthermore, the second electrode layer 1220 is electrically connected to the data line 1250 and the first scan line 1260a through the switching element 1240b. The switching element 1240b can serve as a potential control structure of the second electrode layer 1220 to control a potential of the second electrode layer 1220 to be equal to a potential of the first electrode layer 1210 or a potential of the third electrode layer 1230.

Specifically, the difference between the pixel structure 1200 and the pixel structure 1000 shown in FIG. 10B is that the third electrode layer 1230 of the pixel structure 1200 serves as the common electrode, and the first electrode layer 1210 of the pixel structure 1200 serves as the pixel electrode. Since the common electrode of the pixel structure 1200 is at the top of the pixel structure 1200, the unexpected electric field coming from the bottom of the pixel structure 1200 can be blocked, and the mask layer for blocking light leakage can be saved to increase the aperture ratio of the pixel structure 1200. Additionally, since the channel layer 1244b of the switching element 1240b and the first electrode layer 1010 are simultaneously formed in the same step, the manufacturing steps and the throughput of manufacturing process the can be reduced, and the simplification of the mask can be achieved.

In summary, the pixel structure in the present disclosure is switched between a first mode and a second mode by the second electrode layer disposed between the first electrode layer and the third electrode layer, in which the first mode has the advantage of high light transmission efficiency while the second mode has the advantage of high response speed for liquid crystals. In this way, the pixel structure can be applied to different scenarios. On the other hand, by changing the appearances, profiles, and various parameters of the second electrode layer and the third electrode layer, the light transmission efficiency, voltage stability, and angle of view of the pixel structure under the first mode and the second mode are further improved.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure covers modifications and variations of this disclosure provided they fall within the scope of the following claims.

What is claimed is:

1. A pixel structure, comprising:
   a first electrode layer;
   a second electrode layer disposed above the first electrode layer, wherein the second electrode layer comprises:
     a first main body portion extending in a first direction;

a second main body portion extending in the first direction;
a first branch portion protruding from the first main body portion to the second main body portion; and
a second branch portion protruding from the second main body portion to the first main body portion;
a third electrode layer disposed above the second electrode layer, wherein the third electrode layer comprises:
a third main body portion extending in the first direction;
a fourth main body portion extending in the first direction; and
a third branch portion connecting the third main body portion to the fourth main body portion; and
a switch element electrically connected to the first electrode layer or the third electrode layer.

2. The pixel structure of claim 1, wherein the second main body portion of the second electrode layer comprises:
a plurality of first inclined segments; and
a plurality of second inclined segments, wherein the first inclined segments and the second inclined segments interconnect alternatively to form a zigzag shape.

3. The pixel structure of claim 2, wherein a first acute angle Φ1 is between the first inclined segments and the first direction, and a second acute angle Φ2 is between the second inclined segments and the second direction, and the first acute angle Φ1 is equal to the second acute angle Φ2.

4. The pixel structure of claim 2, wherein the second branch portion is located at a junction between one of the first inclined segments and one of the second inclined segments.

5. The pixel structure of claim 1, wherein the first branch portion is a pentagon, and the second branch portion is a trapezoid.

6. The pixel structure of claim 5, wherein an area of the first branch portion is smaller than an area of the second branch portion.

7. The pixel structure of claim 6, wherein a side of the first branch portion is perpendicular to the first direction, and the other four sides are at least partially symmetrical to four sides of the second branch portion.

8. The pixel structure of claim 1, wherein the first branch portion is aligned with the second branch portion.

9. The pixel structure of claim 1, wherein the first branch portion is staggered with the second branch portion.

10. The pixel structure of claim 1, wherein the third branch portion of the third electrode layer comprises:
a first connecting segment connecting to the third main body portion or the fourth main body portion, and a first acute angle θ1 is between the first connecting segment and a second direction perpendicular to the first direction;
a second connecting segment connecting to the first connecting segment, and a second acute angle θ2 is between the second connecting segment and the second direction; and
a third connecting segment connecting to the second connecting segment, and a third acute angle θ3 is between the third connecting segment and the second direction, wherein the second acute angle θ2 is larger than the first acute angle θ1 and the third acute angle θ3.

11. The pixel structure of claim 10, wherein the first connecting segment partially overlaps the first branch portion, the second connecting segment partially overlaps the first branch portion and the second branch portion, and the third connecting segment overlaps the second main body portion and the second branch portion.

12. The pixel structure of claim 1, wherein the first main body portion partially overlaps the third main body portion.

13. The pixel structure of claim 12, further comprising:
a data line or a gate line extending in the first direction, wherein the first main body portion and the third main body portion overlap the data line or the gate line, and the first electrode layer does not overlap the data line or the gate line.

14. The pixel structure of claim 12, further comprising:
a data line or a gate line extending in the first direction, wherein the first main body portion and the third main body portion do not overlap the data line or the gate line, and the first electrode layer overlaps the data line or the gate line.

15. The pixel structure of claim 1, further comprising:
a data line or a gate line extending in the first direction, wherein the first electrode layer, the first main body portion, and the third main body portion partially overlap the data line or the gate line.

16. The pixel structure of claim 1, further comprising:
a voltage control structure electrically connected to the second electrode layer and being able to control an electric potential of the second electrode layer to be equal to an electric potential of the first electrode layer or the third electrode layer in a switchable manner.

17. The pixel structure of claim 1, wherein a number of the third branch portions is plural, and two of the third branch portions adjacent to each other form a first opening with the third main body portion and the fourth main body portion.

18. The pixel structure of claim 17, wherein the second electrode layer separates the first opening into two second openings.

19. The pixel structure of claim 1, wherein numbers of the first main body portion, the first branch portion, the second branch portion, and the third branch portion are plural, and the second electrode layer is symmetrical to the third electrode layer about the second main body portion.

20. The pixel structure of claim 1, wherein numbers of the first main body portion, the first branch portion, the second branch portion, and the third branch portion are plural, and the second electrode layer is symmetrical to the third electrode layer about a second direction perpendicular to the first direction.

21. The pixel structure of claim 1, further comprising a bridging electrode electrically connected to the first electrode layer.

22. The pixel structure of claim 21, further comprising:
a data line extending in the first direction and electrically connected to the second electrode and the third electrode; and
a scan line extending in the second direction and electrically connected to the first electrode through the bridging electrode.

23. The pixel structure of claim 1, further comprising a bridging electrode electrically connected to the third electrode layer.

24. The pixel structure of claim 23, further comprising:
a data line extending in the first direction and electrically connected to the first electrode and the second electrode; and
a scan line extending in the second direction and electrically connected to the third electrode through the bridging electrode.

* * * * *